United States Patent
Koike et al.

(10) Patent No.: US 12,112,003 B2
(45) Date of Patent: Oct. 8, 2024

(54) METHOD OF TRANSMITTING TRANSMISSION DATA FROM SENSOR CONTROLLER TO PEN, AND PEN

(71) Applicant: Wacom Co., Ltd., Saitama (JP)

(72) Inventors: Takeshi Koike, Saitama (JP); Haruhiko Hisano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/311,724

(22) Filed: May 3, 2023

(65) Prior Publication Data

US 2023/0350523 A1    Nov. 2, 2023

Related U.S. Application Data

(63) Continuation of application No. 17/518,310, filed on Nov. 3, 2021, now Pat. No. 11,675,463, which is a
(Continued)

(51) Int. Cl.
*G06F 3/041* (2006.01)
*G06F 3/0354* (2013.01)
(Continued)

(52) U.S. Cl.
CPC ........ *G06F 3/0441* (2019.05); *G06F 3/03545* (2013.01); *G06F 3/0383* (2013.01);
(Continued)

(58) Field of Classification Search
CPC .. G06F 3/0441; G06F 3/0383; G06F 3/03545; G06F 3/041661; G06F 3/04162;
(Continued)

(56) References Cited

U.S. PATENT DOCUMENTS

| 5,940,064 | A |   | 8/1999 | Kai et al. |
| 6,118,205 | A | * | 9/2000 | Wood .................. G06F 3/03545 |
| | | | | 310/317 |

(Continued)

FOREIGN PATENT DOCUMENTS

| WO | 00/10120 A1 | 2/2000 |
| WO | 2018/051388 A1 | 3/2018 |

OTHER PUBLICATIONS

Communication Pursuant to Rule 164(1) EPC, dated Mar. 29, 2022, for European Application No. 19928391.2-1216 / 3968132, 14 pages.
(Continued)

*Primary Examiner* — Olga V Merkoulova
(74) *Attorney, Agent, or Firm* — Seed IP Law Group LLP

(57) ABSTRACT

A method is provided for transmitting transmission data from a sensor controller that detects a pen to the pen through a sensor electrode group. The pen includes a pen tip electrode arranged near a pen tip, and an analog circuit that detects edges of a signal led to the pen tip electrode. The pen also includes a digital circuit that performs a correlation operation of an output signal of the analog circuit and known patterns to detect the transmission data. The sensor controller is configured to generate a pulse signal representing the transmission data. The sensor controller is configured to transmit the pulse signal, by using a main signal and a sub
(Continued)

signal of the pulse signal so as to enhance the edges, thereby transmitting the transmission data through the sensor electrode group.

12 Claims, 13 Drawing Sheets

Related U.S. Application Data continuation of application No. PCT/JP2019/018842, filed on May 10, 2019.

(51) Int. Cl.
*G06F 3/038* (2013.01)
*G06F 3/044* (2006.01)

(52) U.S. Cl.
CPC ...... *G06F 3/041661* (2019.05); *G06F 3/0445* (2019.05); *G06F 3/0446* (2019.05)

(58) Field of Classification Search
CPC ................ G06F 3/0445; G06F 3/0446; G06F 2203/04106; G06F 3/041
See application file for complete search history.

(56) References Cited

U.S. PATENT DOCUMENTS

| 7,495,589 | B1 | 2/2009 | Trifonov et al. |
| 9,281,811 | B2* | 3/2016 | Bruennert ................ H03K 5/14 |
| 10,296,039 | B2* | 5/2019 | Katsurahira ........ G06F 3/04162 |
| 11,029,769 | B2* | 6/2021 | Gray ..................... G06F 3/0393 |
| 11,675,463 | B2* | 6/2023 | Koike ................ G06F 3/03545 |
| | | | 345/174 |
| 2009/0051667 | A1 | 2/2009 | Park et al. |
| 2018/0095495 | A1* | 4/2018 | Katsurahira .............. G06F 1/24 |
| 2018/0157341 | A1* | 6/2018 | Oda ...................... G06F 3/0383 |
| 2019/0044506 | A1* | 2/2019 | Naumann ................ H03K 7/00 |
| 2020/0387243 | A1* | 12/2020 | Gray ..................... G06F 3/0412 |

OTHER PUBLICATIONS

Hamaguchi et al., "A 240Hz-Reporting-Rate Mutual-Capacitance Touch-Sensing Analog Front-End Enabling Multiple Active/Passive Styluses with 41dB/32dB SNR for 0.5mm Diameter," IEEE International Solid-State Circuits Conference, 2015, p. 120-122.
International Search Report, mailed Jul. 9, 2019, for International Application No. PCT/JP2019/018842, 2 pages.

* cited by examiner

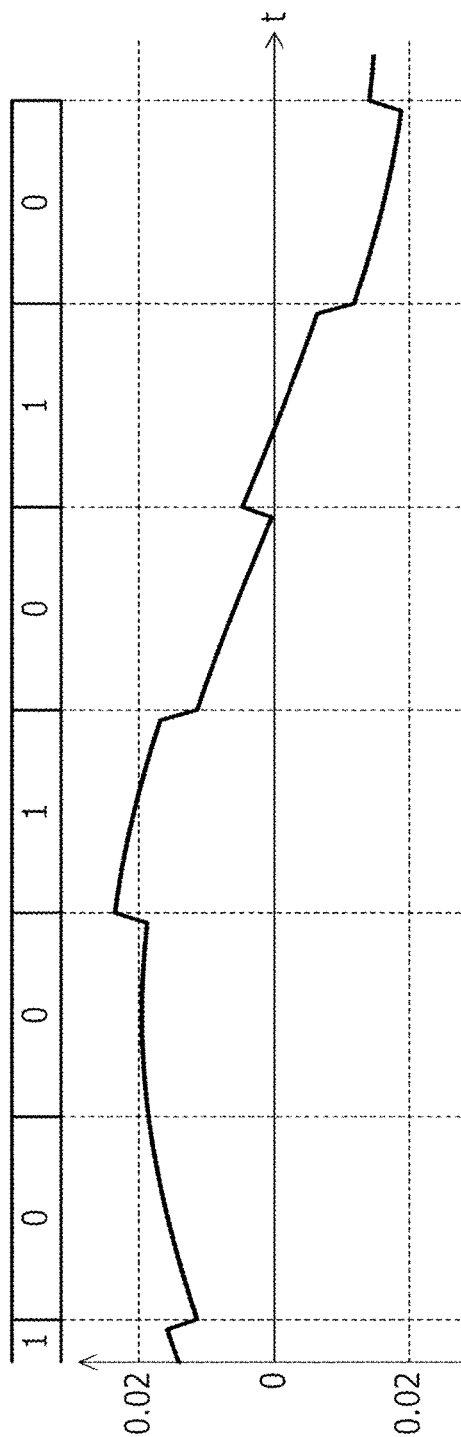
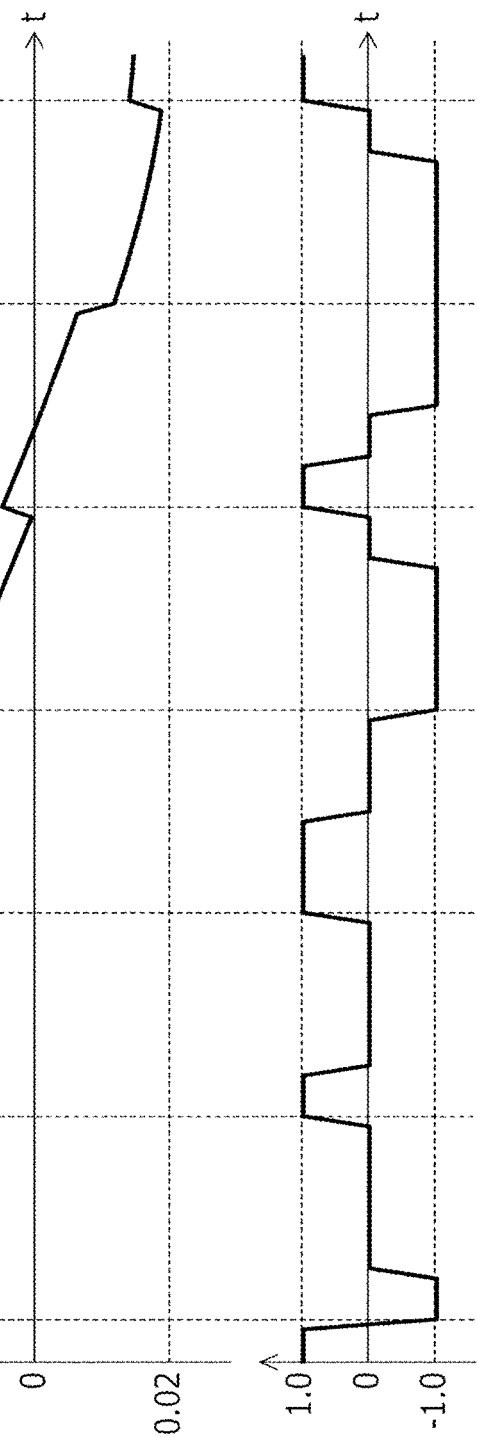
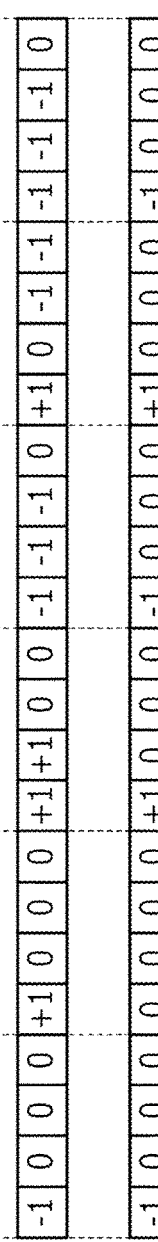
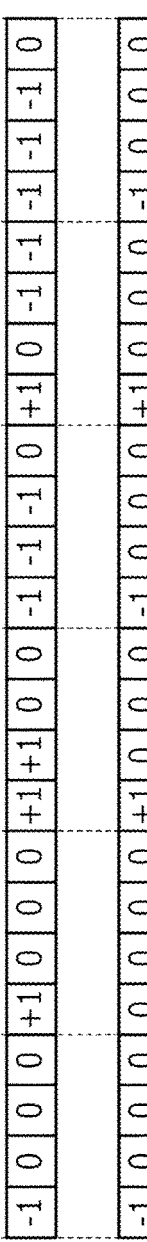
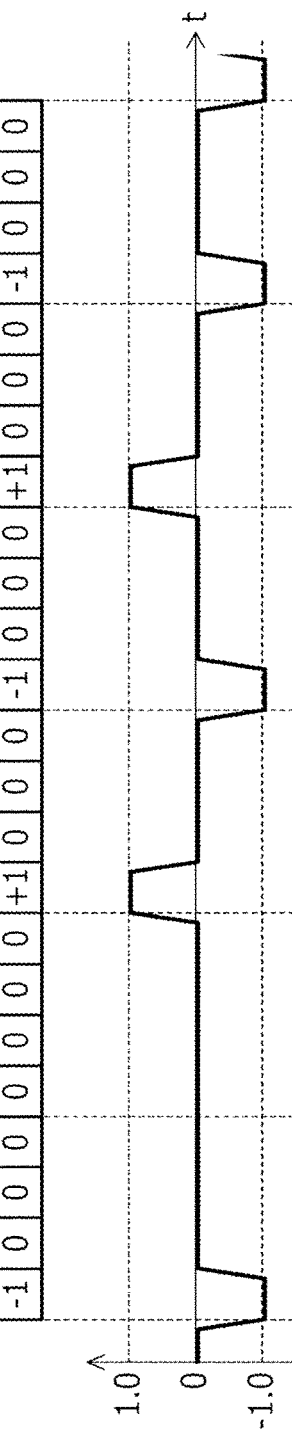
FIG.15A
FIG.15B
FIG.15C
FIG.15D
FIG.15E
FIG.15F

METHOD OF TRANSMITTING TRANSMISSION DATA FROM SENSOR CONTROLLER TO PEN, AND PEN

TECHNICAL FIELD

The present invention relates to a method of transmitting transmission data from a sensor controller to a pen, and a pen.

BACKGROUND ART

A position detection system is known that includes an active stylus (hereinafter, referred to as a "pen") that is a position indicator with internal power supply, and a position detection apparatus including a touch surface. In this type of position detection system, signals are transmitted and received between the position detection apparatus and the pen through a sensor electrode group arranged just below the touch surface. The signals (hereinafter, referred to as "uplink signals") transmitted from the position detection apparatus to the pen play a role of synchronizing the pen with the position detection apparatus and play a role of transmitting various commands to the pen. On the other hand, the signals (hereinafter, referred to as "downlink signals") transmitted from the pen to the position detection apparatus play a role of causing the position detection apparatus to detect the position of the pen and play a role of transmitting data requested by commands to the position detection apparatus.

Examples of the position detection system are disclosed in Patent Document 1 and Non Patent Document 1. Of these, a pen disclosed in Patent Document 1 includes a reception circuit configured to detect falling edges and rising edges of a reception signal and restore a waveform of an uplink signal based on the detected falling edges and rising edges, thereby allowing to adequately restore the waveform of the uplink signal even if low frequency noise is superimposed on the uplink signal.

PRIOR ART DOCUMENT

Patent Document

Patent Document 1: PCT Patent Publication WO2018/051388

Non Patent Document

Non Patent Document 1: Co-written by Mutsumi Hamaguchi, Michiaki Takeda, and Masayuki Miyamoto, "A 240 Hz-Reporting-Rate Mutual Capacitance Touch-Sensing Analog Front-End Enabling Multiple Active/Passive Styluses with 41 dB/32 dB SNR for 0.5 mm Diameter," IEEE International Solid-State Circuits Conference, 2015, p. 120-122

SUMMARY OF INVENTION

Technical Problem

However, if there is dullness in the waveform of the uplink signal, it may become difficult to detect the edges in the first place. Consequently, the waveform of the uplink signal cannot be restored even with the technique described in Patent Document 1.

Therefore, an object of the present invention is to provide a method for allowing a pen to properly receive an uplink signal even if there is dullness in a waveform of the uplink signal and to provide a pen.

Technical Solution

The present invention provides a method of transmitting transmission data from a sensor controller that detects a pen to the pen through a sensor electrode group. The pen includes a pen tip electrode arranged near a pen tip, an analog circuit that detects edges of a signal led to the pen tip electrode, and a digital circuit that performs a correlation operation of an output signal of the analog circuit and known patterns to detect the transmission data. The sensor controller is configured to generate a pulse signal representing the transmission data, and transmit the pulse signal by using a main signal and a sub signal of the pulse signal so as to enhance the edges, thereby transmitting the transmission data through the sensor electrode group.

The present invention provides a pen that receives transmission data transmitted through a sensor electrode group by a sensor controller that detects the pen. The pen includes a pen tip electrode arranged near a pen tip, a differential circuit that detects edges of a signal led to the pen tip electrode, a $\Delta\Sigma$ modulation unit that uses two reference potentials corresponding to at least positive and negative values, respectively, to compare an output signal of the differential circuit and the two reference potentials and that executes feedback processing of comparison results, and a digital circuit that performs a correlation operation of an output signal of the $\Delta\Sigma$ modulation unit and known patterns to detect the transmission data.

Advantageous Effects

According to the method of the present invention, the edges of the uplink signal are enhanced, and this increases the possibility that the pen can detect the edges even if there is dullness in the waveform of the uplink signal. Therefore, the pen can properly receive the uplink signal.

According to the pen of the present invention, the edges can be surely detected by the folding modulation executed by the $\Delta\Sigma$ modulation unit even if there is dullness in the waveform of the uplink signal, and this increases the possibility that the pen can detect the edges. Therefore, the pen can properly receive the uplink signal.

BRIEF DESCRIPTION OF DRAWINGS

FIG. 15A is a diagram illustrating an example of a chip sequence transmitted by the sensor controller 31, FIG. 15B is a diagram illustrating an example of a reception signal Rx observed in the pen 2 receiving the chip sequence illustrated in FIG. 15A, FIG. 15C is a diagram illustrating an example of an output signal CO obtained from the reception signal Rx illustrated in FIG. 15B, FIG. 15D is a diagram illustrating a chip sequence obtained from the output signal CO illustrated in FIG. 15C, FIG. 15E is a diagram illustrating a pattern stored in a pattern storage unit 73 according to the chip sequence illustrated in FIG. 15A, and FIG. 15F is a diagram expressing the pattern illustrated in FIG. 15E by a pulse signal.

MODES FOR CARRYING OUT THE INVENTION

Hereinafter, embodiments of the present invention will be described in detail with reference to the attached drawings.

Figure 1:
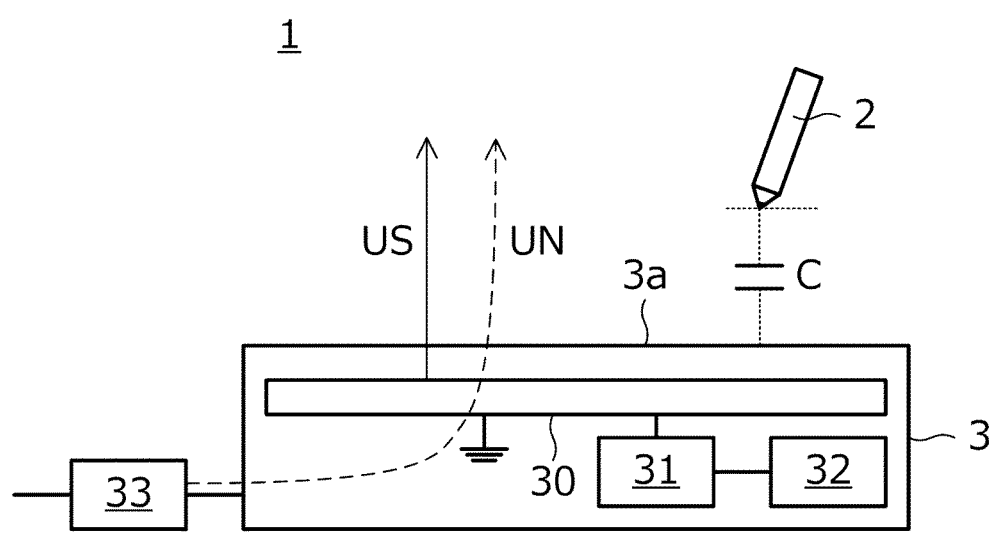
FIG. 1 is a diagram illustrating a configuration of a position detection system 1 according to a first embodiment of the present invention.

FIG. 1 is a diagram illustrating a configuration of a position detection system 1 according to a first embodiment of the present invention. As illustrated in FIG. 1, the position detection system 1 includes a pen 2 that is an active stylus and a tablet 3 that is a position detection apparatus configured to detect a pen.

The tablet 3 includes a touch surface 3a, a sensor electrode group 30 arranged just below the touch surface 3a, a sensor controller 31 connected to the sensor electrode group 30, and a host processor 32 that controls components of the sensor controller 31 including these elements. In addition, the tablet 3 is connected to a charger 33 (alternating current (AC) adapter), and the tablet 3 can be operated by power supplied from a system power source through the charger 33.

When the pen 2 is near the touch surface 3a, capacitance C is generated between the pen 2 and the sensor electrode group 30. The pen 2 can exchange charge (form a capacitive coupling) through the capacitance to communicate with the sensor controller 31.

The communication between the pen 2 and the sensor controller 31 is bidirectional. FIG. 1 illustrates an uplink signal US transmitted from the sensor controller 31 to the pen 2 in the bidirectional communication. The uplink signal US is a signal indicating an instruction (command) for the pen 2, and the pen 2 that has received the uplink signal US executes a process according to the instruction indicated in the uplink signal US. When transmission of data is instructed, the pen 2 acquires the instructed data and transmits the data to the sensor controller 31 through a downlink signal. The data transmitted in this way includes, for example, a unique identification (ID) of the pen 2, pen pressure indicating the pressure applied to the pen tip of the pen 2, on/off information of a switch provided on the pen 2, and the like.

Figure 2:
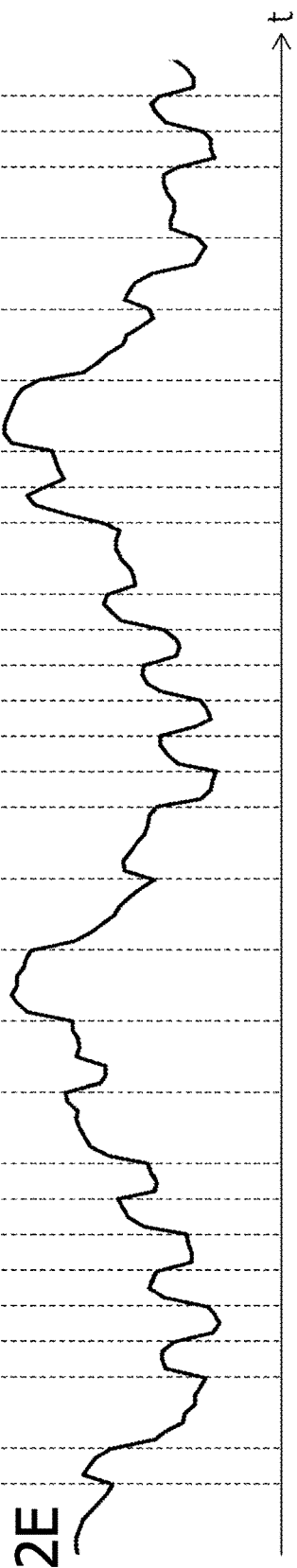
FIG. 2A is a diagram illustrating a configuration example of an uplink signal US.
FIG. 2B is a diagram illustrating an example of a spread code corresponding to a preamble P.
FIG. 2C is a diagram illustrating a chip sequence generated by a sensor controller 31 based on transmission data after replacement with the spread code.
FIG. 2D is a diagram illustrating a pulse signal generated by the sensor controller 31 based on the chip sequence illustrated in FIG. 2C.
FIG. 2E is a diagram illustrating an example of a reception waveform when a pen 2 receives the pulse signal illustrated in FIG. 2D.

FIG. 2A is a diagram illustrating a configuration example of the uplink signal US. As illustrated in FIG. 2A, the uplink signal US includes six pieces of transmission data including two preambles P, data D1 to D3 of 1 byte each, and an error detection code CRC. The sensor controller 31 uses a spread code with autocorrelation characteristics to spread each piece of the transmission data to generate a pulse signal. Further, the sensor controller 31 transmits the pulse signal through the sensor electrode group 30 to transmit the uplink signal US.

FIG. 2B is a diagram illustrating an example of the spread code corresponding to the preamble P. Different spread codes corresponding to the content (such as P, "0000," and "0001") of the transmission data are stored in advance in the sensor controller 31, and the sensor controller 31 executes a process of replacing the transmission data with the spread code corresponding to the content. Although the number of chips included in one spread code is 20 in the example illustrated in FIG. 2B, it is obvious that the number of chips of the spread code is not limited to 20.

FIG. 2C is a diagram illustrating a chip sequence generated by the sensor controller 31 based on the transmission data after replacement with the spread code. As illustrated in FIG. 2C, the sensor controller 31 replaces "0" with "10" and replaces "1" with "01" in the spread code to generate the chip sequence (Manchester coding). The replacement is performed to prevent continuation of three or more chips of the same value.

FIG. 2D is a diagram illustrating a pulse signal generated by the sensor controller 31 based on the chip sequence illustrated in FIG. 2C. As illustrated in FIG. 2D, the sensor controller 31 associates "1" with "high" and associates "0" with "low" in the chip sequence to generate the pulse signal.

FIG. 2E is a diagram illustrating an example of a reception waveform when the pen 2 receives the pulse signal illustrated in FIG. 2D. As illustrated in FIG. 2E, low frequency noise is superimposed on the pulse signal in some cases. Low frequency noise UN illustrated in FIG. 1 is an example of the low frequency noise superimposed on the pulse signal, and the low frequency noise UN is generated from the charger 33. In addition, low frequency noise from various noise sources existing around the sensor controller 31 may be superimposed on the pulse signal.

When the low frequency noise is superimposed on the pulse signal, there is dullness in the reception waveform as illustrated in FIG. 2E. When the degree of dullness is large, the restoration of the uplink signal US in the pen 2 is difficult. An object of the present invention is to allow the pen 2 to properly receive the uplink signal US even in such a case.

Figure 3:
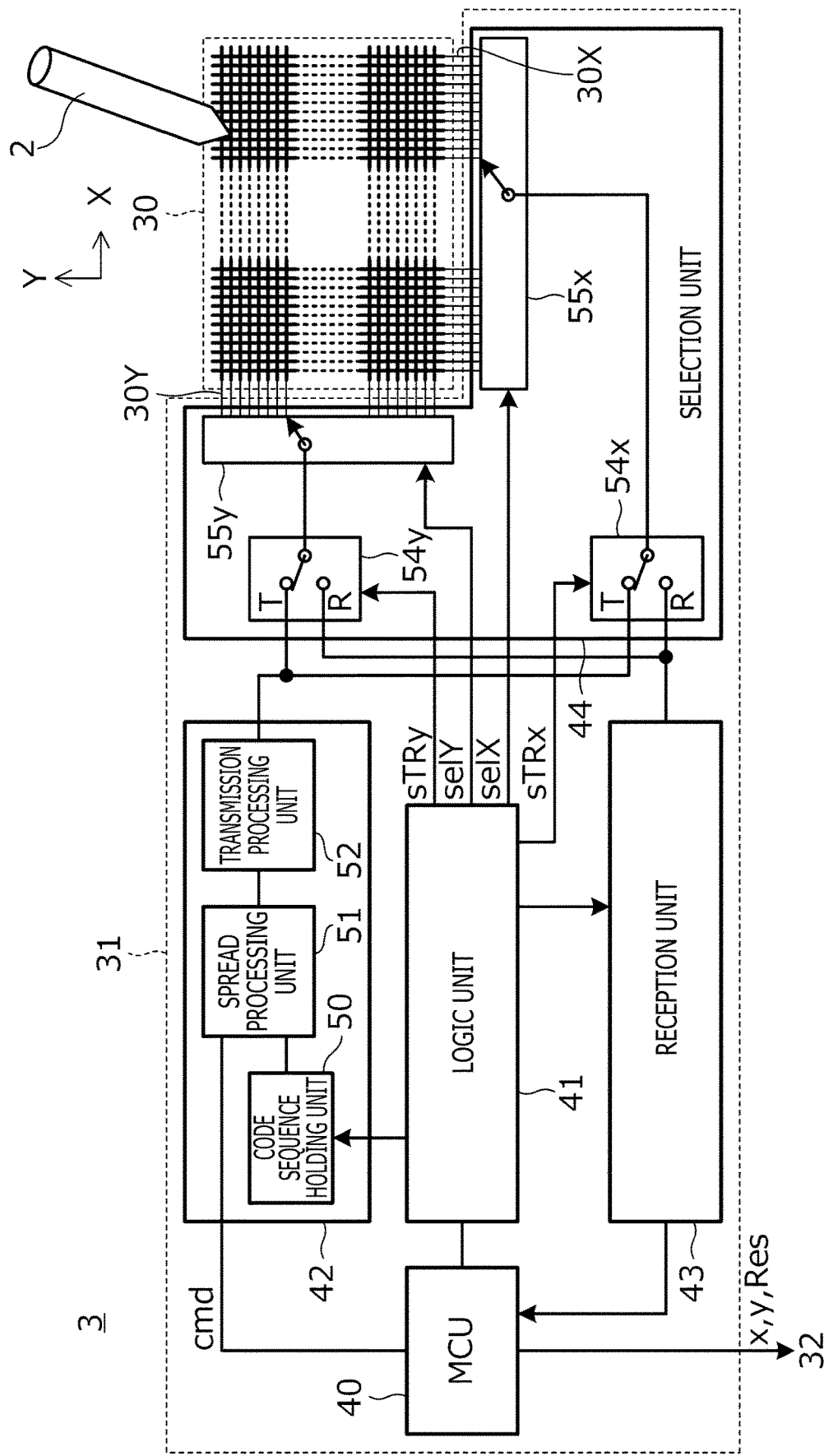
FIG. 3 is a diagram illustrating a detailed configuration of a tablet 3.

FIG. 3 is a diagram illustrating a detailed configuration of the tablet 3. Hereinafter, a configuration and an operation of the tablet 3 will be described in detail with reference to FIG. 3.

The sensor electrode group 30 includes a plurality of sensor electrodes 30X each extending in a Y-direction and a plurality of sensor electrodes 30Y each extending in an X-direction, and the sensor electrode group 30 is capacitive coupled to a pen tip electrode 21 (described later) of the pen 2 through the sensor electrodes 30X and 30Y. The transmission and the reception of the uplink signal US and the downlink signal are realized through the capacitive coupling. Hereinafter, the sensor electrodes 30X and 30Y may be simply referred to as sensor electrodes 30 when the sensor electrodes 30X and 30Y do not have to be particularly distinguished.

Figure 4:
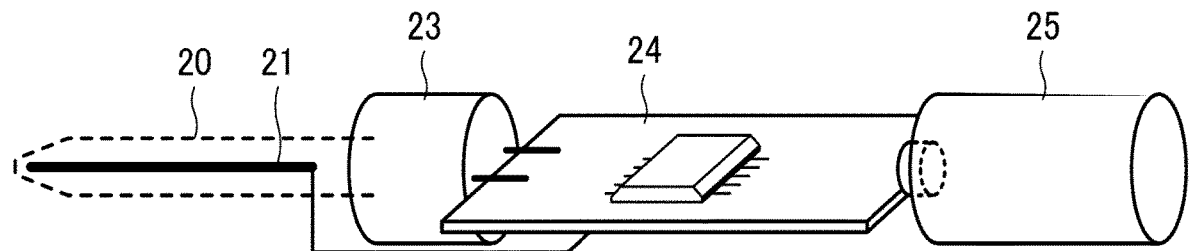
FIG. 4 is a diagram illustrating an internal structure of the pen 2.

The sensor controller 31 includes a micro control unit (MCU) 40, a logic unit 41, a transmission unit 42, a reception unit 43, and a selection unit 44 as illustrated in FIG. 4.

The MCU 40 and the logic unit 41 are control units that control the transmission unit 42, the reception unit 43, and the selection unit 44 to control transmission and reception operations of the sensor controller 31. More specifically, the MCU 40 is a microprocessor that includes a read-only memory (ROM) and a random access memory (RAM) inside and that operates based on a predetermined program. On the other hand, the logic unit 41 is configured to generate control signals of the transmission unit 42, the reception unit 43, and the selection unit 44 based on the control of the MCU 40.

The MCU 40 has a function of receiving the downlink signal transmitted by the pen 2 through the reception unit 43 and a function of generating a command cmd to be transmitted to the pen 2 and supplying the command cmd to the transmission unit 42. The downlink signal includes a position signal that is an unmodulated carrier signal and includes a data signal including data corresponding to the command cmd. When the MCU 40 receives a position signal from the pen 2, the MCU 40 calculates position coordinates (x, y) of the pen 2 on the touch surface 3a from the reception strength in each of the plurality of sensor electrodes 30X and 30Y included in the sensor electrode group 30 and outputs the position coordinates (x, y) to the host processor 32. In addition, when the MCU 40 receives a data signal from the pen 2, the MCU 40 acquires response data Res (specifically, unique ID, pen pressure, on/off information of switch, and the like) included in the data signal and outputs the response data Res to the host processor 32.

The transmission unit 42 is a circuit that generates the uplink signal US according to the control of the MCU 40 and the logic unit 41, and as illustrated in FIG. 4, the transmission unit 42 includes a code sequence holding unit 50, a spread processing unit 51, and a transmission processing unit 52.

The code sequence holding unit 50 has a function of generating and holding the spread codes (spread codes with autocorrelation characteristics) based on the control signal supplied from the logic unit 41. The code sequence holding unit 50 is configured to generate and store different spread codes corresponding to the content (such as P, "0000," and "0001") of the transmission data.

The spread processing unit 51 is a functional unit that generates the pulse signal illustrated in FIG. 2D based on the command cmd supplied from the MCU 40. More specifically, the spread processing unit 51 first generates the uplink signal US illustrated in FIG. 2A based on the command cmd. Further, for each of the plurality of pieces of transmission data included in the uplink signal US, the spread processing unit 51 selects one of the spread codes held by the code sequence holding unit 50 and uses the selected spread codes to spread the transmission data. As a result, the chip sequence illustrated in FIG. 2B is obtained. The spread processing unit 51 further executes the Manchester coding to acquire the chip sequence illustrated in FIG. 2C. In addition, the spread processing unit 51 generates the pulse signal illustrated in FIG. 2D based on the acquired chip sequence.

The transmission processing unit 52 is a functional unit that transmits the pulse signal generated by the spread processing unit 51 so as to enhance the edges. The "transmission of pulse signal so as to enhance edges" in the present embodiment denotes using various methods described later to transmit the pulse signal so as to increase the numbers of rising edges and falling edges included in the pulse signal. The details will be separately described later. However, other methods may be used to transmit the pulse signal so as to enhance the edges.

The reception unit 43 is a circuit that receives the downlink signal transmitted by the pen 2 based on the control signal supplied from the logic unit 41. Specifically, the reception unit 43 is configured to decode the signal supplied from the selection unit 44 to generate a digital signal and configured to supply the digital signal as a reception signal to the MCU 40.

The selection unit 44 includes switches 54x and 54y and conductor selection circuits 55x and 55y.

Each of the switches 54x and 54y is a switch element in which a common terminal and one of a T terminal and an R terminal are connected. The common terminal of the switch 54x is connected to the conductor selection circuit 55x, the T terminal is connected to an output end of the transmission unit 42, and the R terminal is connected to an input end of the reception unit 43. In addition, the common terminal of the switch 54y is connected to the conductor selection circuit 55y, the T terminal is connected to the output end of the transmission unit 42, and the R terminal is connected to the input end of the reception unit 43.

The conductor selection circuit 55x is a switch element that selectively connects the plurality of sensor electrodes 30X to the common terminal of the switch 54x. The conductor selection circuit 55x can connect part or all of the plurality of sensor electrodes 30X at the same time to the common terminal of the switch 54x.

The conductor selection circuit 55y is a switch element that selectively connects the plurality of sensor electrodes 30Y to the common terminal of the switch 54y. The conductor selection circuit 55y can also connect part or all of the plurality of sensor electrodes 30Y at the same time to the common terminal of the switch 54y.

Four control signals sTRx, sTRy, selX, and selY are supplied from the logic unit 41 to the selection unit 44. Specifically, the control signal sTRx is supplied to the switch 54x, the control signal sTRy is supplied to the switch 54y, the control signal selX is supplied to the conductor selection circuit 55x, and the control signal selY is supplied to the conductor selection circuit 55y. The logic unit 41 uses the control signals sTRx, sTRy, selX, and selY to control the selection unit 44 to realize the transmission of the uplink signal US and the reception of the downlink signal transmitted by the pen 2.

More specifically, to transmit the uplink signal US, the logic unit 41 controls the selection unit 44 to connect, to the output end of the transmission unit 42, all of the plurality of sensor electrodes 30Y (or all of the plurality of sensor electrodes 30X) or a predetermined number of the plurality of sensor electrodes 30X and 30Y near the position most recently derived for the pen 2 that receives the uplink signal US. On the other hand, the logic unit 41 in the case of receiving the position signal controls the selection unit 44 to sequentially connect, to the input end of the reception unit 43, all of the plurality of sensor electrodes 30X and 30Y (global scan) or a predetermined number of the plurality of sensor electrodes 30X and 30Y near the position derived from the most recent position signal of the pen 2 that transmits the position signal (local scan), while the transmission of the position signal is continuing. In this way, the MCU 40 can derive the position of the pen 2 based on the reception strength of the burst signal in each sensor electrode 30. In addition, the logic unit 41 in the case of receiving the data signal controls the selection unit 44 to connect, to the input end of the reception unit 43, a predetermined number of the plurality of sensor electrodes 30X and 30Y near the position derived from the most recent position signal of the pen 2 that transmits the data signal.

The configuration and the operation of the tablet 3 have been described. Next, a configuration and an operation of the pen 2 will be described in detail.

FIG. 4 is a diagram illustrating an internal configuration of the pen 2. As illustrated in FIG. 4, the pen 2 includes a core (a central rod) 20, the pen tip electrode 21, a pen pressure detection sensor 23, a circuit board 24, and a battery 25. Although not illustrated, the pen 2 further includes, on a side surface or a bottom surface of a housing, a switch that can be operated by the user.

The core 20 is a rod-shaped member, and the core 20 is arranged so that a pen holder direction of the pen 2 and a longitudinal direction of the core 20 coincide with each other. The pen tip electrode 21 is a conductor arranged near the pen tip, and the pen tip electrode 21 includes, for example, a conductive substance embedded inside the core 20. In another example, a conductive material may be applied to the surface of the tip portion of the core 20 to provide the pen tip electrode 21.

The pen pressure detection sensor 23 is physically connected to the core 20, and the pen pressure detection sensor 23 can detect the pen pressure applied to the tip of the core 20. Specifically, a variable capacitor in which the capacitance changes according to the pen pressure can be used as the pen pressure detection sensor 23.

The pen tip electrode 21 is electrically connected to the circuit board 24, and the pen tip electrode 21 plays a role of receiving the uplink signal US transmitted by the tablet 3 to supply the uplink signal US to the circuit board 24 and transmitting the downlink signal supplied from the circuit board 24 toward the tablet 3. Although the pen tip electrode 21 performs both the transmission and the reception here, an electrode for transmission and an electrode for reception may be separately provided. The battery 25 is a power source that supplies operating power to each of these elements and the like in the circuit board 24.

Figure 5:
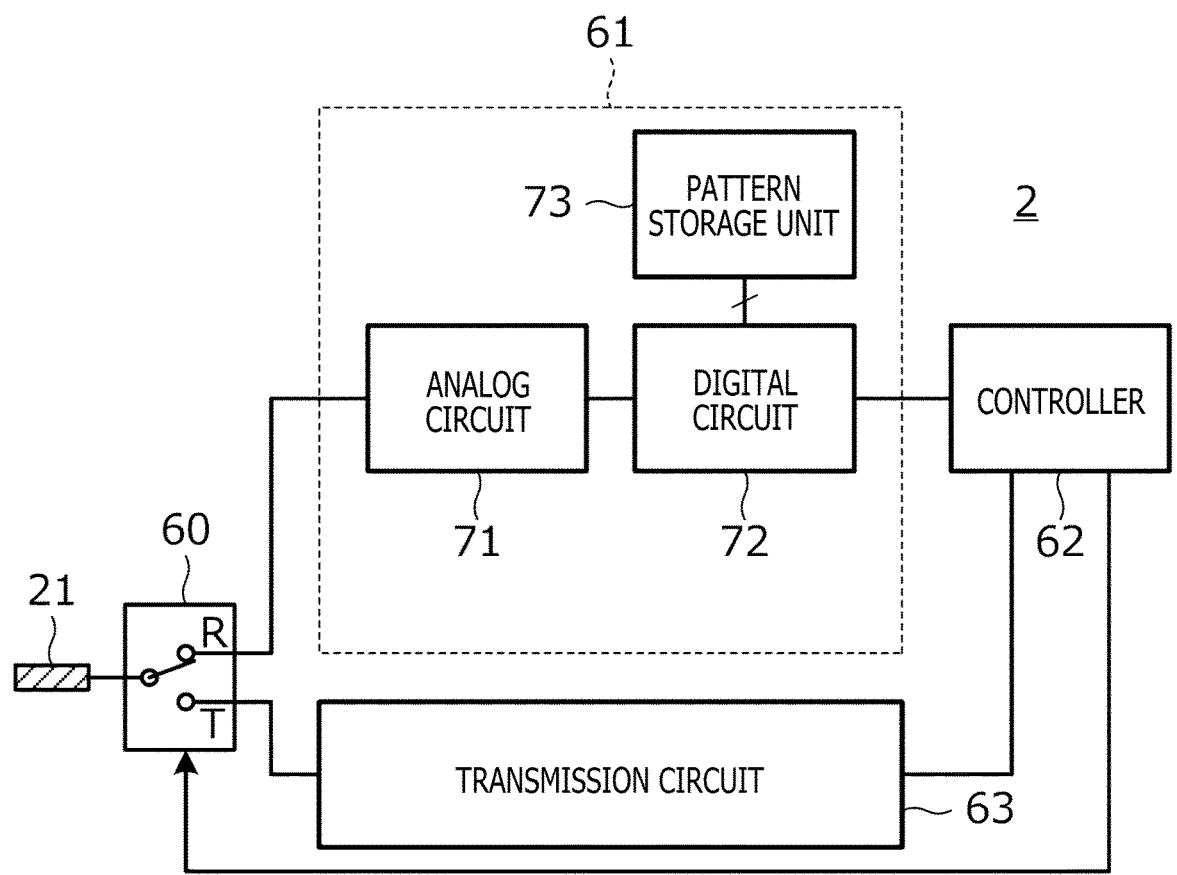
FIG. 5 is a schematic block diagram illustrating functional blocks of the pen 2.

FIG. 5 is a schematic block diagram illustrating functional blocks of the pen 2. The functional blocks illustrated in FIG. 5 are realized by electronic circuits formed on the circuit board 24.

As illustrated in FIG. 5, the pen 2 functionally includes a switch 60, a reception circuit 61, a controller 62, and a transmission circuit 63.

The switch 60 is a switch element in which a common terminal and one of a T terminal and an R terminal are connected. The common terminal of the switch 60 is connected to the pen tip electrode 21, the T terminal is connected to an output end of the transmission circuit 63, and the R terminal is connected to an input end of the reception circuit 61. The connection state of the switch 60 is controlled by the controller 62. The controller 62 controls the switch 60 to connect the common terminal and the R terminal in the case of the reception of the uplink signal US from the sensor controller 31 and controls the switch 60 to connect the common terminal and the T terminal in the case of the transmission of the downlink signal (position signal or data signal) toward the sensor controller 31.

The reception circuit 61 is a circuit that demodulates the signal received through the pen tip electrode 21 and the switch 60 to acquire the uplink signal US and that outputs the uplink signal US to the controller 62. An analog circuit 71, a digital circuit 72, and a pattern storage unit 73 are provided inside the reception circuit 61 as illustrated in FIG. 5.

The analog circuit 71 includes an edge detection circuit that detects edges included in the signal supplied from the switch 60 (signal led to the pen tip electrode 21) and a waveform restoration circuit that restores the waveform from the edges detected by the edge detection circuit. Although the specific configuration of each circuit is not limited, for example the edge detection circuit can include a differential circuit that generates a differential signal of the signal supplied from the switch 60, a positive direction pulse detection circuit that detects rising edges of the differential signal, and a negative direction pulse detection circuit that detects falling edges of the differential signal. In addition, the waveform restoration circuit can include an SR latch circuit including an S input that receives an output signal of the positive direction pulse detection circuit and an R input that receives an output signal of the negative direction pulse detection circuit. The signal output from the waveform restoration circuit is included in the output signal of the analog circuit 71, and ideally, the signal has the same waveform as the waveform of the pulse signal generated by the spread processing unit 51 of the sensor controller 31 (see FIG. 2D).

The digital circuit 72 is a circuit that performs correlation operation of the output signal of the analog circuit 71 and known patterns stored in the pattern storage unit 73 to detect the transmission data transmitted by the sensor controller 31.

More specifically, a plurality of chip sequences are first stored as known patterns in the pattern storage unit 73. Each chip sequence is a chip sequence of two values including a plurality of chips, each with a value of 0 or 1. The chip sequences are obtained by applying Manchester coding to each of the plurality of spread codes that may be used by the sensor controller 31 to transmit the uplink signal US.

The digital circuit 72 includes a first-in first-out shift register that can store chip sequences corresponding to the number of chips in one spread code, and the digital circuit 72 stores the output signal of the analog circuit 71 in the shift register every time the digital circuit 72 acquires one chip. Further, every time the digital circuit 72 stores one new chip, the digital circuit 72 calculates the correlation between the chip sequence stored in the shift register at that point and each of the plurality of known patterns stored in the pattern storage unit 73. As a result, when the calculation result for a certain pattern is equal to or greater than a predetermined value, the digital circuit 72 determines that the spread code corresponding to the pattern is detected. The digital circuit 72 restores the uplink signal US based on the spread codes detected one after another in this way and outputs the uplink signal US to the controller 62.

The controller 62 is a processor including a memory inside, and the controller 62 operates according to a program stored in the memory.

The operation performed by the controller 62 includes a process corresponding to the uplink signal US supplied from the reception circuit 61. More specifically, the controller 62 executes a process of determining a transmission and reception schedule of various signals according to the uplink signal US supplied from the reception circuit 61 and controlling the connection state of the switch 60 according to the transmission and reception schedule. That is, as described above, the controller 62 controls the switch 60 to connect the common terminal and the R terminal in the case of the reception of the uplink signal US from the sensor controller 31 and controls the switch 60 to connect the common terminal and the T terminal in the case of the transmission of the signal (position signal or data signal) toward the sensor controller 31.

The controller 62 executes a process of instructing the transmission circuit 63 to transmit the position signal at transmission timing of the position signal indicated in the determined transmission and reception schedule. In addition, when the command indicated in the uplink signal US supplied from the reception circuit 61 indicates a transmission instruction of various types of data (such as unique ID, pen pressure, and on/off information of switch), the controller 62 executes a process of acquiring the instructed data and supplying the data as transmission data to the transmission circuit 63 at the transmission timing of the data signal indicated in the determined transmission and reception schedule.

The transmission circuit 63 includes an oscillation circuit of a predetermined carrier signal, and when the controller 62 instructs the transmission circuit 63 to transmit the position signal, the transmission circuit 63 supplies the carrier signal to the pen tip electrode 21 without modulation. On the other hand, when the transmission data is supplied from the controller 62, the transmission circuit 63 uses the supplied transmission data to modulate the carrier signal and supplies the modulated carrier signal to the pen tip electrode 21.

Next, the process of "transmission of pulse signal so as to enhance edges" executed by the transmission processing unit 52 illustrated in FIG. 3 will be described in detail.

Figure 6A:
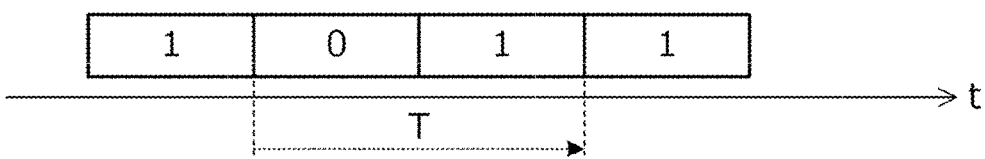
FIG. 6A is a diagram illustrating part of a chip sequence (chip sequence after Manchester coding) generated by a spread processing unit 51.
Figure 6B:
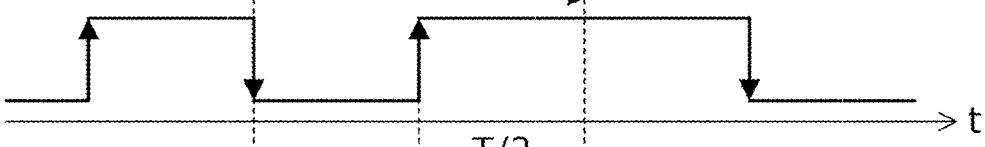
FIG. 6B is a diagram illustrating a pulse signal generated by the spread processing unit 51 based on the chip sequence illustrated in FIG. 6A.

FIG. 6A is a diagram illustrating part of a chip sequence (chip sequence after Manchester coding) generated by the spread processing unit 51, and FIG. 6B is a diagram illustrating a pulse signal (main signal) generated by the spread processing unit 51 based on the chip sequence. An illustrated chip length T indicates the time length of each chip (time length of one chip) included in the spread code before the Manchester coding.

Figure 6C:
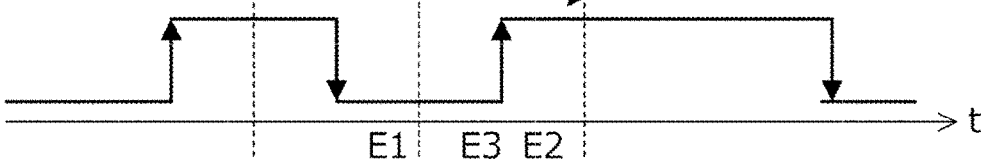
FIG. 6C is a diagram illustrating a delay signal generated by a transmission processing unit 52 based on the pulse signal illustrated in FIG. 6B, and FIGS. 6D and 6E are diagrams illustrating mixed signals generated by the transmission processing unit 52 based on the pulse signal illustrated in FIG. 6B.
Figure 6D:
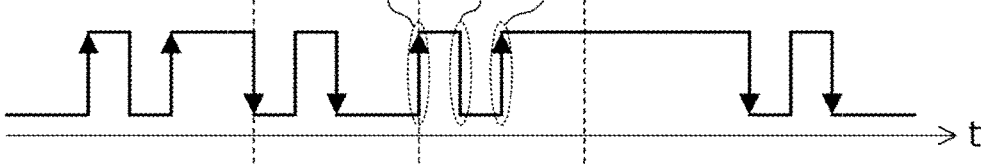

FIGS. 6C and 6D are diagrams illustrating a delay signal (sub signal) and a mixed signal generated by the transmission processing unit 52 based on the pulse signal illustrated in FIG. 6B, respectively. The transmission processing unit 52 that has received the pulse signal from the spread processing unit 51 first changes the edge timing of the pulse signal to generate the delay signal illustrated in FIG. 6C. More specifically, the transmission processing unit 52 delays the pulse signal by a time (T/4 in the example of FIG. 6C) shorter than a half T/2 the chip length T to generate the delay signal.

Next, the transmission processing unit 52 generates the mixed signal illustrated in FIG. 6D based on the pulse signal illustrated in FIG. 6B and the delay signal illustrated in FIG. 6C. The mixed signal generated in this way is a signal including two corresponding edges (for example, illustrated edges E1 and E2) in the time shorter than the half T/2 the chip length T starting at each edge of the pulse signal. Although two edges are included here, the number of delay signals may be increased to provide three or more corresponding edges. It is more preferable to provide an even number of corresponding edges.

Figure 6E:
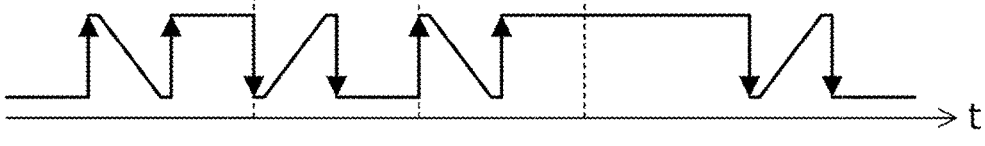

Here, as can be understood from FIG. 6D, the mixed signal generated by the transmission processing unit 52 according to the present embodiment includes a return edge (for example, illustrated edge E3) in the opposite direction of the corresponding edges in the time shorter than the half T/2 the chip length T starting at each edge of the pulse signal. If the mixed signal is transmitted from the sensor electrode group 30 in this state, the edge detection circuit in the analog circuit 71 also detects the return edge as an edge, and as a result, a wrong waveform may be restored. Therefore, as illustrated in FIG. 6E, the transmission processing unit 52 may set the slope of the return edge to a slope gentler than the slope of each edge of the pulse signal. This reduces the possibility that the edge detection circuit in the analog circuit 71 will detect the return edge as an edge, and the possibility of the restoration of a wrong waveform can be reduced.

As described above, according to the transmission method of the uplink signal US of the present embodiment, the edges received by the pen 2 can be increased to enhance the edges of the uplink signal US. This increases the possibility that the pen can detect the edges even if there is dullness in the waveform of the uplink signal US, and the pen 2 can properly receive the uplink signal US.

Note that there can be various modifications of the present embodiment. Hereinafter, the modifications will be described one by one.

In a first modification of the present embodiment, a pulse signal that is a main signal generated by the spread processing unit 51 and a sub signal generated by the transmission processing unit 52 based on the pulse signal are transmitted from different sensor electrodes 30 to transmit a mixed signal. The sensor controller 31 in this case is configured to supply the main signal and the sub signal created by the transmission processing unit 52 to different sensor electrodes 30. Therefore, the sub signal according to the present modification is a different electrode signal transmitted from a sensor electrode 30 different from the sensor electrode 30 for the main signal. However, it is preferable that the content of the sub signal includes the same delay signal as the delay signal of the present embodiment. In this way, the mixed signal can be transmitted without generating the mixed signal illustrated in FIG. 6D or 6E.

Figure 7:
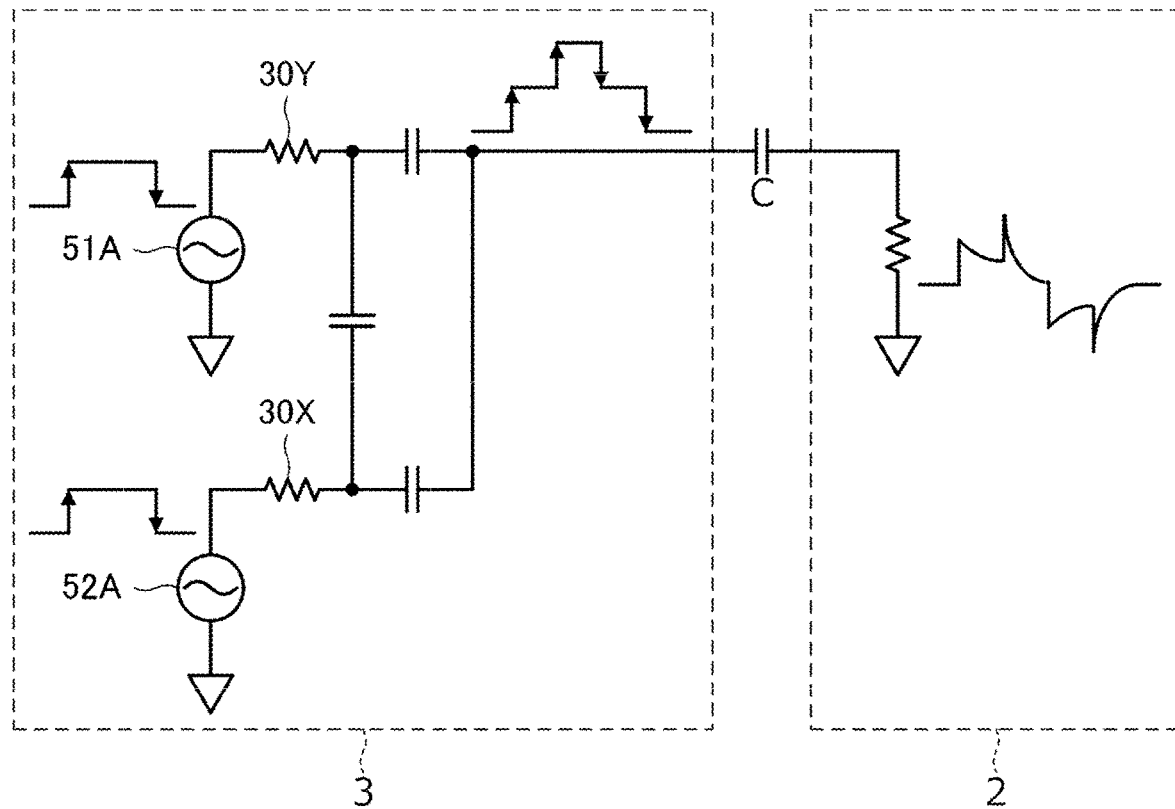
FIG. 7 is a schematic circuit diagram illustrating a second modification of the first embodiment of the present invention.

FIG. 7 is a schematic circuit diagram illustrating a second modification of the present embodiment. A signal source 51A illustrated in FIG. 7 indicates a pulse signal (main signal) generated by the spread processing unit 51, and a signal source 52A illustrates a sub signal generated by the transmission processing unit 52. The tablet 3 according to the present modification is configured to use both of the layered sensor electrodes 30X and 30Y to transmit the main signals and the sub signals to transmit mixed signals. Specifically, the tablet 3 is configured to transmit the main signals from at least part of the sensor electrodes 30Y arranged in a first layer and transmit the sub signals from at least part of the sensor electrodes 30X arranged in a second layer different from the first layer.

The sub signal according to the present embodiment is a different electrode signal as in the first modification, and the content of the sub signal may include the same delay signal as the delay signal of the present embodiment or may include a signal exactly the same as the main signal. The former case can obtain an advantageous effect of increasing the edges received by the pen 2 as in the present embodiment. The same signals are transmitted from two layers in the latter case, and the latter case can obtain an advantageous effect of enhancing the edges compared to when the signals are transmitted from only one layer.

Figure 8A:
FIGS. 8A to 8C are the same diagrams as FIGS. 6A to 6C.
Figure 8B:
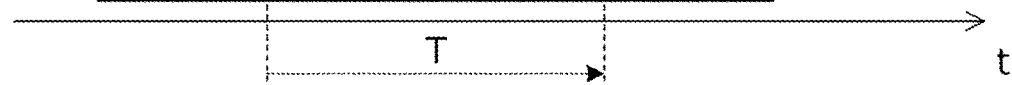
Figure 8C:
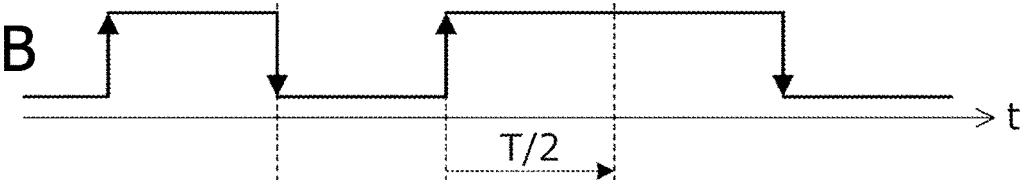
Figure 8D:
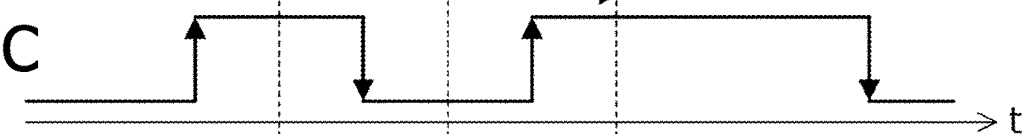
FIG. 8D is a diagram illustrating a mixed signal transmitted in the second modification of the first embodiment of the present invention.

FIG. 8D is a diagram illustrating a mixed signal transmitted in the present modification when the delay signal of the main signal is the sub signal. Note that FIGS. 8A to 8C are the same diagrams as FIGS. 6A to 6C. As illustrated in FIG. 8D, the mixed signal according to the present modification is a sum of the pulse signal and the delay signal. As can be understood from FIG. 8D, this can also increase the number of edges received by the pen 2 to enhance the edges of the uplink signal US. In addition, according to the present modification, the return edge is not generated, and this can reduce the possibility that the analog circuit 71 will restore a wrong waveform.

The present modification can also be advantageously applied to a case in which the tablet 3 is a position detection apparatus of what is generally called an in-cell system. The in-cell system is a system in which an electrode (typically, common electrode of liquid crystal display or negative electrode of organic electroluminescence (EL) display) supplied with potential necessary for driving the pixel of the display apparatus arranged on top of the sensor electrode group 30 is used as one of the sensor electrodes 30X and 30Y. Therefore, when the present modification is applied to the in-cell tablet 3, one of the main signal and the sub signal is transmitted from, for example, one of the sensor electrodes 30X and 30Y that is the common electrode of the liquid crystal display, and the other of the main signal and the sub signal is transmitted from the other of the sensor electrodes 30X and 30Y. As in the present modification, this case can also obtain an advantageous effect of enhancing the edges of the uplink signal US and an advantageous effect of reducing the possibility that the analog circuit 71 will restore a wrong waveform.

Figure 9:
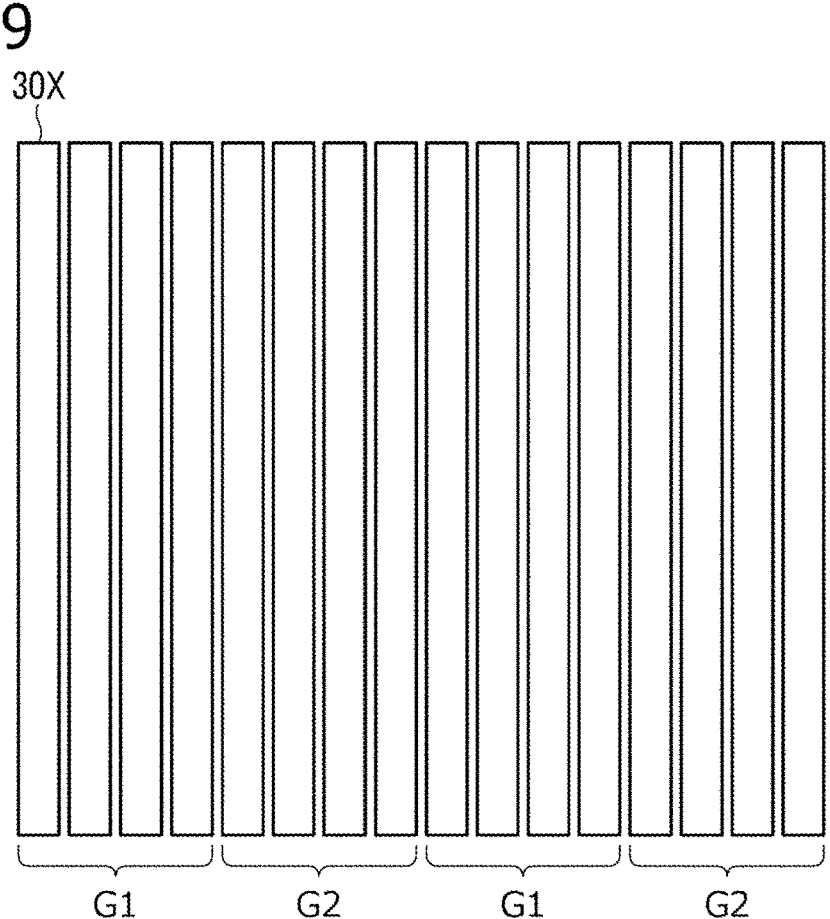
FIG. 9 is a diagram illustrating a plurality of sensor electrodes 30X according to a third modification of the first embodiment of the present invention.

FIG. 9 is a diagram illustrating the plurality of sensor electrodes 30X according to a third modification of the present embodiment. The tablet 3 according to the present modification classifies the plurality of sensor electrodes 30X into a plurality of first sensor electrodes belonging to an illustrated group G1 and a plurality of second sensor electrodes (sensor electrodes 30X belonging to group G2) arranged at positions not overlapping the plurality of first sensor electrodes in plan view. In addition, the transmission processing unit 52 is configured to transmit the pulse signal through the plurality of first sensor electrodes and transmit a reverse-phase signal of the pulse signal through the plurality of second sensor electrodes. This can prevent the uplink signal US from changing the ground potential of the pen 2 through the hand of the person holding the pen 2 so that the pen 2 cannot detect the uplink signal US when, for example, the hand of the person is in contact with the touch surface 3a.

Figure 10:
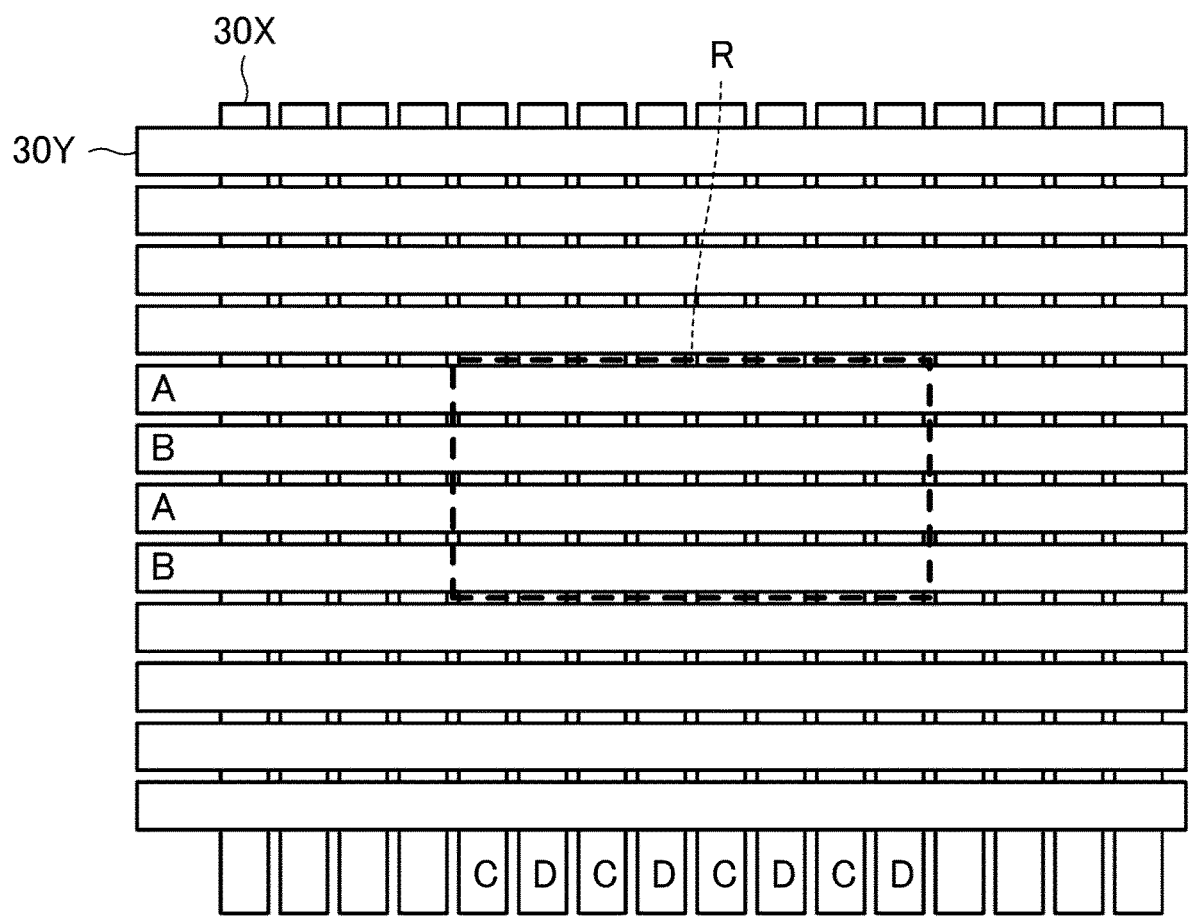
FIG. 10 is a diagram illustrating a plurality of sensor electrodes 30X and 30Y according to a fourth modification of the first embodiment of the present invention.
Figure 11:
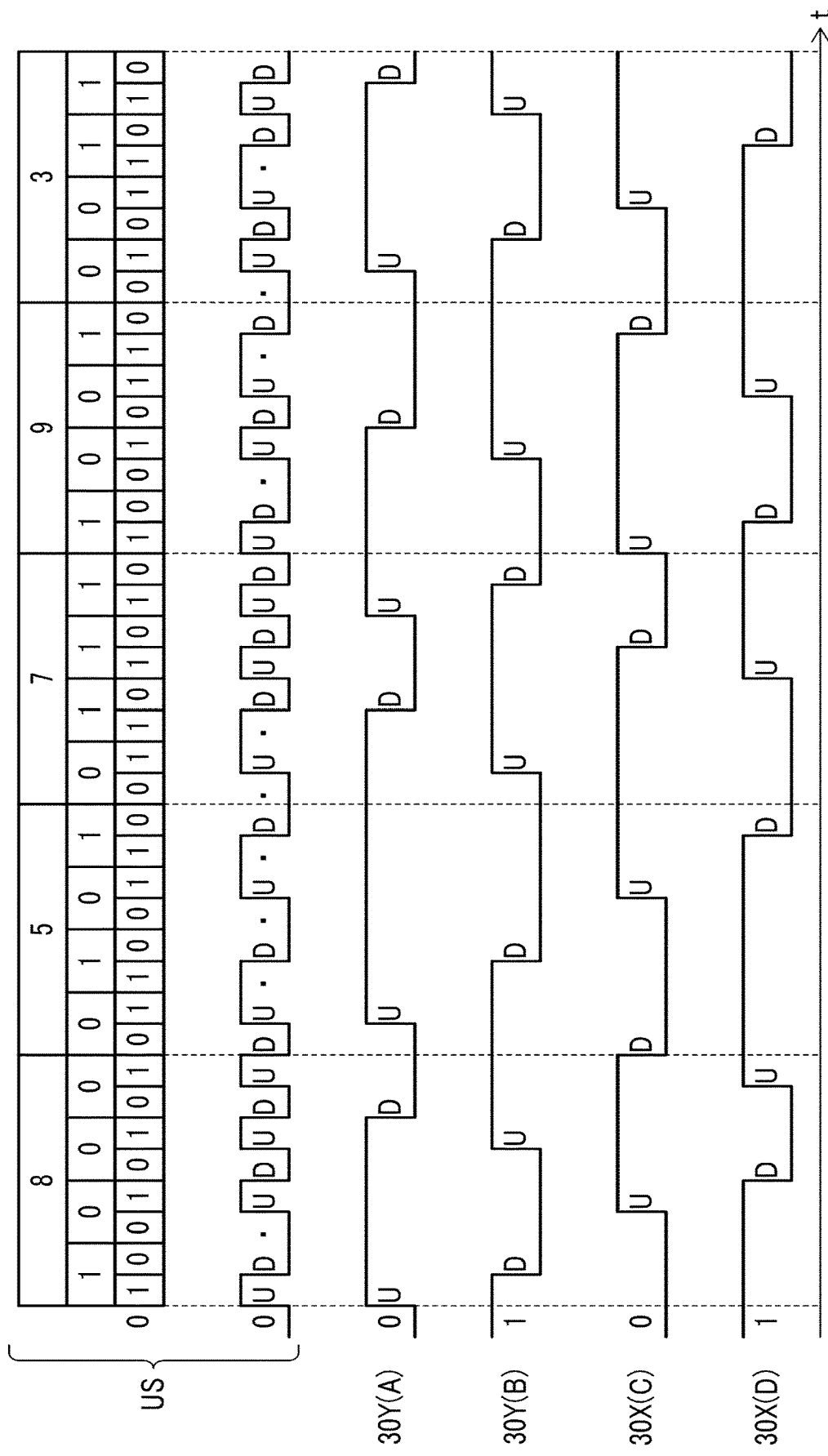
FIG. 11 is a diagram illustrating the uplink signal US transmitted by the sensor controller 31 according to a fourth modification of the first embodiment of the present invention.

FIG. 10 is a diagram illustrating the plurality of sensor electrodes 30X and 30Y according to a fourth modification of the present embodiment. In addition, FIG. 11 is a diagram illustrating the uplink signals US transmitted by the sensor controller 31 according to the present modification. First, with reference to FIG. 10, the sensor controller 31 according to the present modification first determines a region R in which the uplink signals US are transmitted. Although part of the touch surface 3a is the region R in the example depicted in FIG. 10, the entire touch surface 3a may be the region R.

The sensor controller 31 that has determined the region R classifies the plurality of sensor electrodes 30 going through the region R into a plurality of groups so that the sensor electrodes 30 close to each other belong to different groups as much as possible. FIG. 10 illustrates an example of the groups classified in this way. In the example, the sensor electrodes 30Y are alternately classified into a group A and a group B, and the sensor electrodes 30X are alternately classified into a group C and a group D.

FIG. 11 illustrates an example of a case of using the groups A to D illustrated in FIG. 10 to transmit the uplink signal US. Although each of five pieces of transmission data "8," "5," "7," "9," and "3" is transmitted through a chip sequence of eight chips (chip sequence obtained by applying Manchester coding to each of four bits indicating each piece of transmission data) for the simplification of the description in the example illustrated in FIG. 11, actually the spread code may be used to transmit the data as in the present embodiment.

The sensor controller 31 according to the present modification is configured to divide eight chips included in one piece of transmission data into first four chips and second four chips and disperse four edges (rising edges U and falling edges D) of the pulse signal corresponding to the chips to four groups A to D to transmit the transmission data as illustrated in FIG. 11. In this way, the pen 2 positioned in the region R can receive all of the edges and can receive the uplink signal US. However, the pen 2 not positioned in the region R cannot receive part or all of the edges and cannot receive the uplink signal US (even if only part of the edges can be received, the received part is discarded as a result of the error detection using the error detection code CRC illustrated in FIG. 2A). Therefore, according to the present modification, the region in the touch surface 3a can be limited to transmit the uplink signal US. The present modification can be applied to transmit the uplink signal US while limiting the pens 2 that receive the uplink signal US when, for example, a plurality of pens 2 are positioned in the touch surface 3a.

Figure 12A:
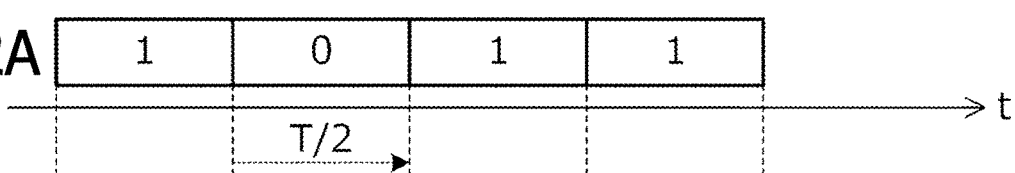
FIGS. 12A-12C illustrate diagrams for describing a fifth modification of the first embodiment of the present invention.
Figure 12B:
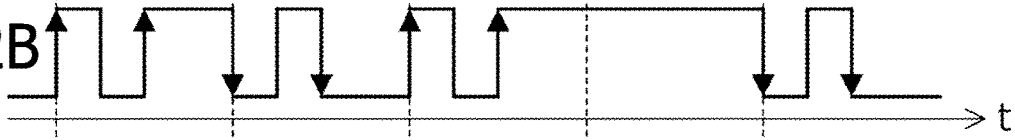

FIG. 12 illustrates diagrams for describing a fifth modification of the present embodiment. Note that FIGS. 12A and 12B are the same diagrams as FIGS. 6A and 6D.

Figure 12C:
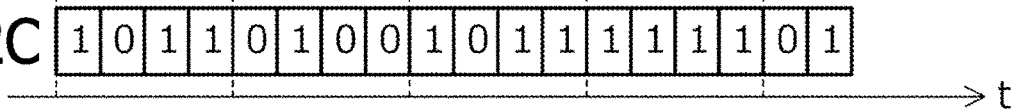

The pulse signal illustrated in FIG. 12B represents the chip sequence illustrated in FIG. 12A, and it can also be stated that the pulse signal represents the chip sequence illustrated in FIG. 12C. This indicates that one pulse signal can be used to transmit two types of data depending on the method of processing in the pen 2. Therefore, in the present modification, two types of patterns including first and second patterns described below are prepared as known patterns used by the pen 2 in the correlation operation to allow the pen 2 to selectively receive two types of data.

The first pattern is a pattern in which the time length of one chip is relatively long. The digital circuit 72 (FIG. 5) of the pen 2 using the first pattern applies a correlation operation with relatively coarse granularity to the output signal of the analog circuit 71 to restore the chip sequence illustrated in FIG. 12A from the pulse signal illustrated in FIG. 12B.

The second pattern is a pattern in which the time length of one chip is relatively short. The digital circuit 72 (FIG. 5) of the pen 2 using the second pattern applies a correlation operation with relatively fine granularity to the output signal of the analog circuit 71 to restore the chip sequence illustrated in FIG. 12C from the pulse signal illustrated in FIG. 12B.

In this way, according to the present modification, two types of patterns with different time lengths of one chip are prepared as known patterns used by the pen 2 in the correlation operation. This can obtain an advantageous effect that one uplink signal US can be used to allow the pen 2 to selectively receive two types of data. Note that in the present modification, the time length per chip of the pattern stored in the pattern storage unit 73 illustrated in FIG. 5 may vary depending on the pen 2. In this way, the sensor controller 31 can use one uplink signal US to transmit different data to two pens 2.

Next, the position detection system 1 according to a second embodiment of the present invention will be described. In the position detection system 1 according to the present embodiment, the reception method of the uplink signal US executed by the reception circuit 61 is different from that of the first embodiment. That is, in the reception circuit 61 according to the present embodiment, ΔΣ modulation is performed in the analog circuit 71, and correlation operation based on three values of +1, 0, and −1 is performed in the digital circuit 72. The position detection system 1 according to the second embodiment is similar to the position detection system 1 according to the first embodiment in other respects. Therefore, the same reference signs are assigned to the same components, and the differences from the position detection system 1 according to the first embodiment will be mainly described below.

Figure 13:
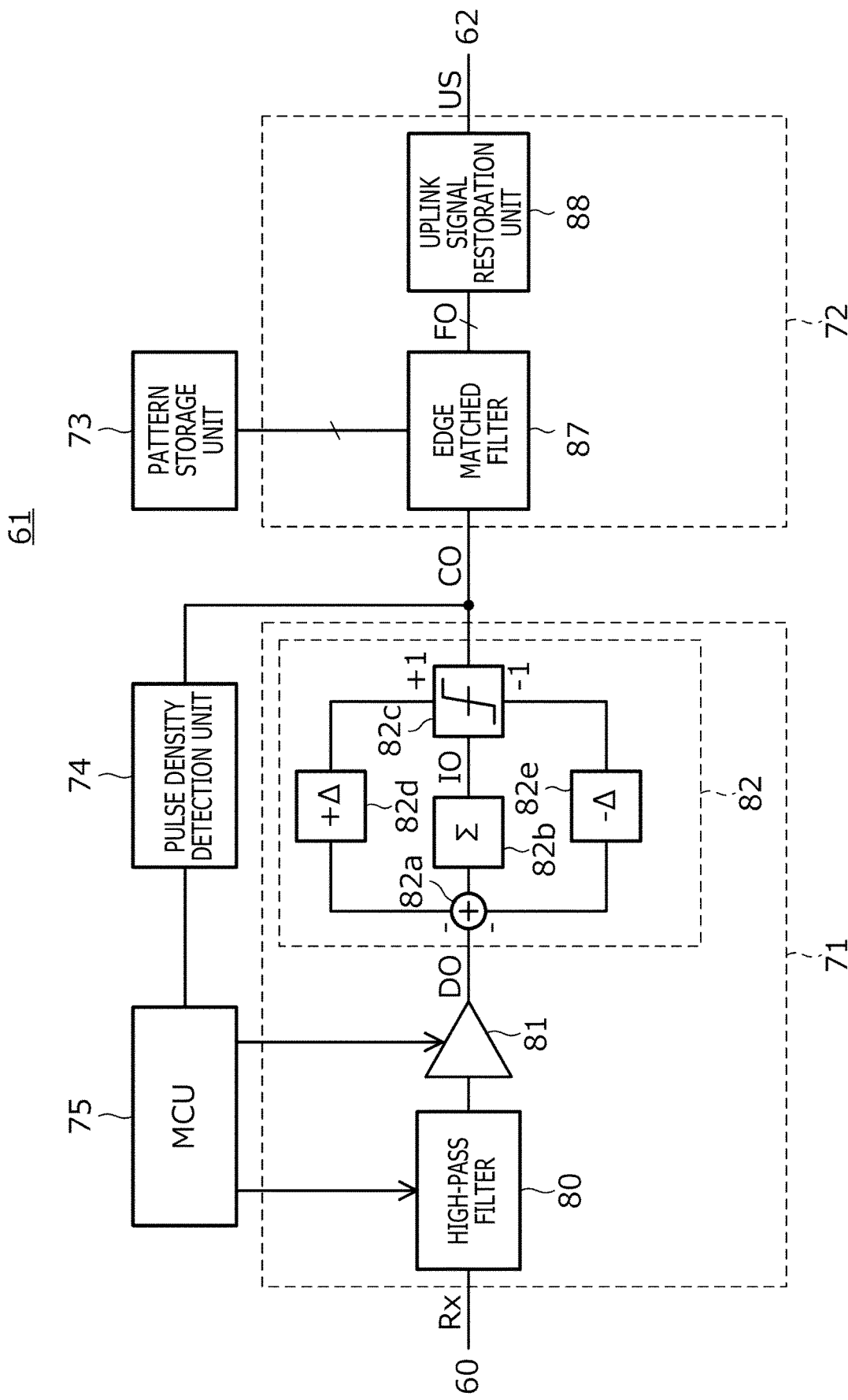
FIG. 13 is a diagram illustrating a configuration of a reception circuit 61 according to a second embodiment of the present invention.

FIG. 13 is a diagram illustrating a configuration of the reception circuit 61 according to the present embodiment. As illustrated in FIG. 13, the reception circuit 61 according to the present embodiment includes a pulse density detection unit 74 and an MCU 75 in addition to the analog circuit 71, the digital circuit 72, and the pattern storage unit 73 as also illustrated in FIG. 5.

The analog circuit 71 according to the present embodiment includes a high-pass filter 80 with an input end connected to the R terminal of the switch 60 (see FIG. 5), an amplification circuit 81 that amplifies an output signal of the high-pass filter 80, and a ΔΣ modulation unit 82. The high-pass filter 80 is a circuit configured to pass only frequency components equal to or higher than a cutoff frequency. The cutoff frequency of the high-pass filter 80 can be controlled by the MCU 75. The amplification circuit 81 is a circuit that amplifies the output signal of the high-pass filter 80 and that supplies the output signal as an output signal DO to the ΔΣ modulation unit 82. The amplification circuit 81 includes a variable gain amplifier in which the amplification factor can be controlled by the MCU 75. The high-pass filter 80 and the amplification circuit 81 function as a differential circuit that detects edges of the signal (reception signal Rx) led to the pen tip electrode 21 (see FIG. 5).

The ΔΣ modulation unit 82 is a functional unit that uses at least two reference potentials VTP and VTN corresponding to positive and negative values to compare the output signal DO of the amplification circuit 81 and the reference potentials VTP and VTN and that executes feedback processing of the comparison results. As illustrated in FIG. 13, the ΔΣ modulation unit 82 includes a subtraction circuit 82a, an addition circuit 82b, a comparison circuit 82c, and delay circuits 82d and 82e.

The comparison circuit 82c is a circuit that compares an output signal IO of the addition circuit 82b and the predetermined reference potentials VTP and VTN (VTP=−VTN>0), and the comparison circuit 82c includes three output terminals including an output terminal of comparison result, a positive-side output terminal (+1), and a negative-side output terminal (−1). Of these, a signal output from the output terminal of comparison result provides an output signal CO of the analog circuit 71.

When the output signal IO of the addition circuit 82b is higher than the reference potential VTP, the comparison circuit 82c outputs +1 for the output signal CO, sets the potential of the positive-side output terminal to high, and sets the potential of the negative-side output terminal to low. In addition, when the output signal IO of the addition circuit 82b is lower than the reference potential VTN, the comparison circuit 82c outputs −1 for the output signal CO, sets the potential of the negative-side output terminal to high, and sets the potential of the positive-side output terminal to low. In other cases, the comparison circuit 82c outputs 0 for the output signal CO and sets both potentials of the positive-side output terminal and the negative-side output terminal to low. As a result of the process executed by the comparison circuit 82c, the output signal CO is a pulse signal with three values of +1, 0, and −1.

The comparison circuit 82c operates at a cycle (for example, T/8) shorter than the chip length (half T/2 the chip length T illustrated in FIG. 6) of the chip sequence transmitted by the sensor controller 31. Therefore, the output signal CO is a pulse signal including a plurality of chips (for example, four chips) with respect to one chip of the chip sequence transmitted by the sensor controller 31.

Figure 14A:
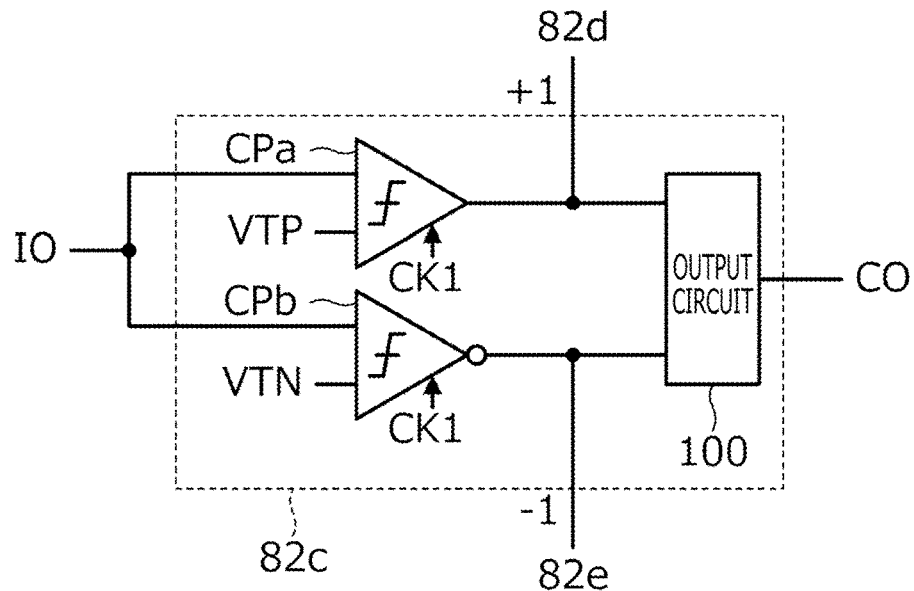
FIG. 14A is a diagram specifically illustrating a circuit configuration of a comparison circuit 82c according to the second embodiment of the present invention.

FIG. 14A is a diagram specifically illustrating a circuit configuration of the comparison circuit 82c according to the present embodiment. As illustrated in FIG. 14A, the comparison circuit 82c includes a comparator CPa corresponding to a positive value, a comparator CPb corresponding to a negative value, and an output circuit 100. The output terminal of the comparator CPa is connected as the positive-side output terminal (+1) to the delay circuit 82d and to the output circuit 100. In addition, the output terminal of the comparator CPb is connected as the negative-side output terminal (−1) to the delay circuit 82e and to the output circuit 100.

The output signal IO of the addition circuit 82b is supplied in common to one input terminal of each of the comparators CPa and CPb. On the other hand, the reference potentials VTP and VTN are supplied to the other input terminals of the comparators CPa and CPb, respectively. In addition, each of the comparators CPa and CPb is configured to execute a comparison operation at timing synchronized with a clock CK1 supplied from a clock circuit not illustrated. The clock CK1 oscillates at a cycle (for example, T/8) shorter than the chip length (half T/2 the chip length T illustrated in FIG. 6) of the chip sequence transmitted by the sensor controller 31. As a result, the output signal CO is a pulse signal including a plurality of chips (for example, four chips) with respect to one chip of the chip sequence transmitted from the sensor controller 31 as described above.

The comparator CPa is configured to output "high" when the output signal IO of the addition circuit 82b is larger than the reference potential VTP and output "low" otherwise. In addition, the comparator CPb is configured to output "low" when the output signal IO of the addition circuit 82b is larger than the reference potential VTN and output "high" otherwise. In this way, the comparison results of the comparison circuit 82c are fed back in three values (that is, +1, 0, and −1) to the subtraction circuit 82a.

The output circuit 100 is a circuit that generates the output signal CO of the $\Delta\Sigma$ modulation unit 82 based on the output of the comparators CPa and CPb. Specifically, the output circuit 100 sets the output signal CO to +1 when the output of the comparator CPa is high, sets the output signal CO to −1 when the output of the comparator CPb is high, and sets the output signal CO to 0 in other cases. This realizes the output signal CO that is a pulse signal with three values of +1, 0, and −1.

Although the comparison circuit 82c of FIG. 14A compares the output signal IO and two reference potentials VTP and VTN here, more reference potentials may be used for the comparison. Specifically, the comparison circuit 82c may compare, for example, the output signal IO and four reference potentials VTP, VTP0, VTN0, and VTN (VTP=−VTN=2×VTP0=−2×VTN0>0). In this case, the comparison results of the comparison circuit 82c are fed back in five values (that is, +2, +1, 0, −1, and −2) to the subtraction circuit 82a. On the other hand, although the details will be described later, the output signal CO of the analog circuit 71 is output in three values (that is, +1, 0, and −1) even when the comparison circuit 82c compares the output signal IO and four reference potentials VTP, VTP0, VTN0, and VTN. The details will now be described.

Figure 14B:
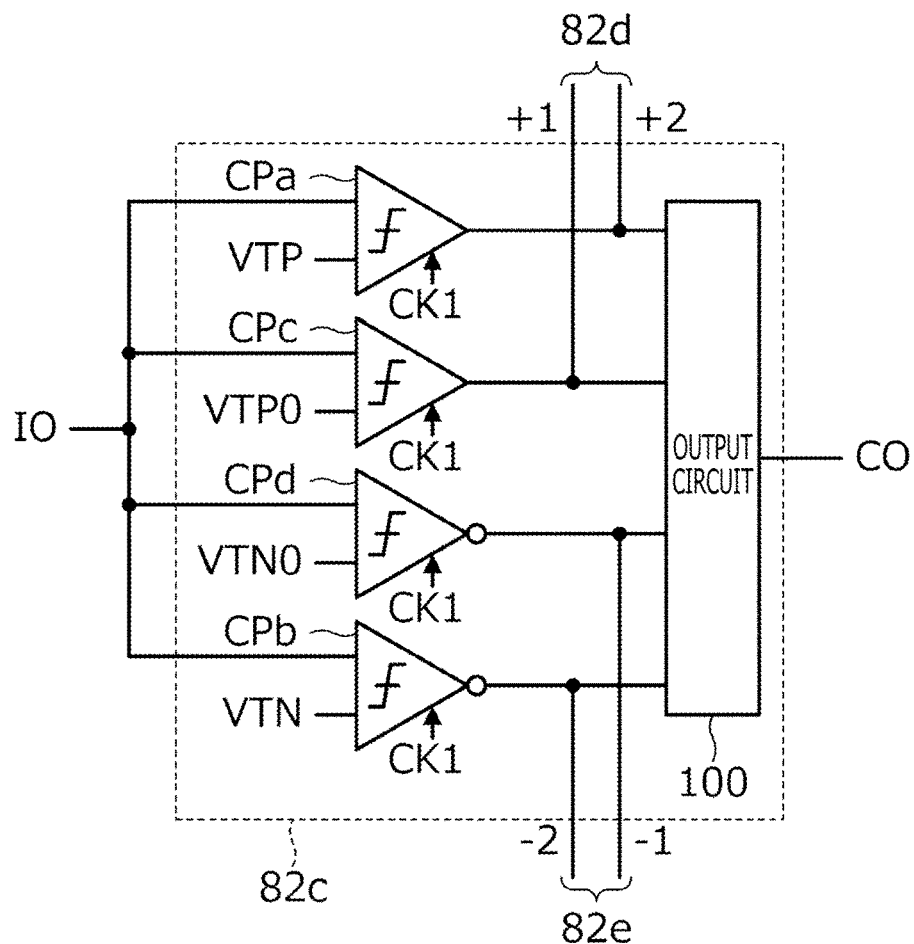
FIG. 14B is a diagram specifically illustrating a circuit configuration of the comparison circuit 82c configured to compare an output signal IO and four reference potentials VTP, VTP0, VTN0, and VTN.

FIG. 14B is a diagram specifically illustrating the circuit configuration of the comparison circuit 82c configured to compare the output signal IO and four reference potentials VTP, VTP0, VTN0, and VTN. As illustrated in FIG. 14B, the comparison circuit 82c in this case includes two comparators CPa and CPc corresponding to positive values, two comparators CPb and CPd corresponding to negative values, and the output circuit 100. The output terminal of the comparator CPa is connected as the positive-side output terminal (+2) to the delay circuit 82d and to the output circuit 100. In addition, the output terminal of the comparator CPb is connected as the negative-side output terminal (−2) to the delay circuit 82e and to the output circuit 100. The output terminal of the comparator CPc is connected as the positive-side output terminal (+1) to the delay circuit 82d and to the output circuit 100, and the output terminal of the comparator CPd is connected as the negative-side output terminal (−1) to the delay circuit 82e and to the output circuit 100.

The output signal IO of the addition circuit 82b is supplied in common to one input terminal of each of the comparators CPa to CPd. On the other hand, the reference potentials VTP, VTN, VTP0, and VTN0 are supplied to the other input terminals of the comparators CPa to CPd, respectively. The comparators CPa to CPd operate at the timing synchronized with the clock CK1, and this is similar to the case of FIG. 14A.

The comparator CPa is configured to output "high" when the output signal IO of the addition circuit 82b is larger than the reference potential VTP and output "low" otherwise. The comparator CPb is configured to output "low" when the output signal IO of the addition circuit 82b is larger than the reference potential VTN and output "high" otherwise. The comparator CPc is configured to output "high" when the output signal IO of the addition circuit 82b is larger than the reference potential VTP0 and output "low" otherwise. The comparator CPd is configured to output "low" when the output signal IO of the addition circuit 82b is higher than the reference potential VTN0 and output "high" otherwise. In this way, the comparison results of the comparison circuit 82c are fed back in five values (that is, +2, +1, 0, −1, and −2) to the subtraction circuit 82a.

The output circuit 100 is configured to generate the output signal CO of the $\Delta\Sigma$ modulation unit 82 based on the output of the comparators CPa and CPb. Specifically, the output circuit 100 sets the output signal CO to +1 when the output of the comparator CPa is high, sets the output signal CO to −1 when the output of the comparator CPb is high, and sets the output signal CO to 0 in other cases. The output of the comparators CPc and CPd is not referenced in generating the output signal CO. This realizes the output signal CO that is a pulse signal with three values of +1, 0, and −1 even though five values are fed back to the subtraction circuit 82a. In this way, the output signal CO includes three values, and this can reduce the scale of the circuit necessary for the correlation operation.

Note that the output circuit 100 may also refer to the output of the comparators CPc and CPd so that the output signal CO includes a pulse signal of five values (that is, +2, +1, 0, −1, and −2). When the output signal CO includes five values in this way, there is an advantageous effect that the digital circuit 72 (see FIG. 13) in a later stage can also take the level values into account to derive the correlation values.

FIG. 13 will be further described. The delay circuit 82d plays a role of multiplying the potential of the positive-side output terminal of the comparison circuit 82c by A, delaying the signal by, for example, one clock (one chip of output signal CO), and feeding back the signal to the subtraction circuit 82a. Similarly, the delay circuit 82e plays a role of multiplying the potential of the negative-side output terminal of the comparison circuit 82c by −A, delaying the signal by, for example, one clock, and feeding back the signal to the subtraction circuit 82a. Note that it is preferable that the specific value of A be a value equal to VTP in the case of the feedback in three values and equal to VTP0 in the case of the feedback in five values.

The subtraction circuit 82a is a circuit that outputs a signal obtained by subtracting the amount of potential corresponding to the output signals of the delay circuits 82d and 82e from the output signal DO of the amplification circuit 81. As a result of the subtraction, the potential level of the input signal of the addition circuit 82b drops when the output signal IO of the previous clock is higher than the reference potential VTP, and the potential level of the input signal of the addition circuit 82*b* rises when the output signal IO of the previous clock is lower than the reference potential VTN. Therefore, there is an advantageous effect that the potential level of the output signal IO of the addition circuit 82*b* falls within a certain range.

The addition circuit 82*b* is a circuit that outputs a signal obtained by integrating the output signal of the subtraction circuit 82*a*. The output signal IO of the addition circuit 82*b* is obtained by adding the output signal of the subtraction circuit 82*a* to the output signal of the addition circuit 82*b* of the previous clock.

FIG. 15A is a diagram illustrating an example of the chip sequence (illustrated in FIG. 2C) transmitted by the sensor controller 31. FIG. 15B is a diagram illustrating an example of the reception signal Rx observed in the pen 2 receiving the chip sequence. FIG. 15C is a diagram illustrating an example of the output signal CO obtained from the reception signal Rx. FIG. 15D is a diagram illustrating a chip sequence obtained from the output signal CO. Note that low frequency noise that is a sine wave is superimposed on the reception signal Rx illustrated in FIG. 15B. As can be understood from these drawings, the output signal CO of the case in which the low frequency noise is superimposed on the reception signal Rx is a pulse signal that oscillates more intensely than the reception signal Rx. This indicates that the ΔΣ modulation unit 82 is more sensitively detecting the change in the reception signal Rx.

FIG. 13 will be further described. The pattern storage unit 73 according to the present embodiment is configured to store, as a known pattern, a chip sequence of three values including a plurality of chips with values of +1, 0, and −1, for each of a plurality of spread codes that may be used by the sensor controller 31 to transmit the uplink signal US.

FIG. 15E is a diagram illustrating a pattern stored in the pattern storage unit 73 according to the chip sequence illustrated in FIG. 15A, and FIG. 15F is a diagram expressing the pattern by a pulse signal. As can be understood from FIGS. 15D and 15E, the pattern stored in the pattern storage unit 73 is a chip sequence including one chip with respect to one chip of the output signal CO. In addition, as can be understood from FIGS. 15A and 15E, the pattern stored in the pattern storage unit 73 is a chip sequence of three values, in which only one chip becomes "−1" according to the change from "+1" to "0" in the transmission chip sequence, only one chip becomes "+1" according to the change from "0" to "+1" in the transmission chip sequence, and the other chips are "0."

FIG. 13 will be further described. The digital circuit 72 according to the present embodiment includes an edge matched filter 87 and an uplink signal restoration unit 88.

The edge matched filter 87 includes a first-in first-out shift register that can store chip sequences corresponding to the number of chips in one spread code, and the edge matched filter 87 stores the output signal CO of the analog circuit 71 in the shift register every time the edge matched filter 87 acquires one chip. Further, every time the edge matched filter 87 stores one new chip, the edge matched filter 87 calculates the correlation between the chip sequence stored in the shift register at that point and each of the plurality of known patterns stored in the pattern storage unit 73. The edge matched filter 87 sequentially supplies the results as output signals FO to the uplink signal restoration unit 88.

The uplink signal restoration unit 88 determines that the spread code corresponding to the pattern used to calculate the output signal FO is detected when the output signal FO is equal to or greater than a predetermined value. Further, the uplink signal restoration unit 88 restores the uplink signal US based on the spread codes detected one after another and outputs the uplink signal US to the controller 62.

The pulse density detection unit 74 is a functional unit that detects the pulse density of the output signal CO of the ΔΣ modulation unit 82 and notifies the MCU 75 of the result. In addition, the MCU 75 is an integrated circuit (control circuit) included in a microprocessor to be embedded, and the MCU 75 plays a role of controlling the gain of the amplification circuit 81 based on the pulse density notified from the pulse density detection unit 74 and controlling the cutoff frequency of the high-pass filter 80.

Here, the gain control of the amplification circuit 81 based on the pulse density will be described. When the absolute value of the input signal of the ΔΣ modulation unit 82 (output signal DO of amplification circuit 81) is too large, the output signal IO of the addition circuit 82*b* is always higher than the reference potential VTP or lower than the reference potential VTN. As a result, the output signal CO is fixed to "+1" or "−1," and the edge detection of the ΔΣ modulation unit 82 does not function. Conversely, when the absolute value of the input signal of the ΔΣ modulation unit 82 (output signal DO of amplification circuit 81) is too small, the state that the output signal IO of the addition circuit 82*b* is between the reference potential VTP and the reference potential VTN continues. The output signal CO is fixed to "0," and the edge detection of the ΔΣ modulation unit 82 also does not function. Therefore, the MCU 75 lowers or raises the gain of the amplification circuit 81 according to the value of the output signal DO when the pulse density notified from the pulse density detection unit 74 is equal to or smaller than a predetermined value. The potential level of the output signal DO drops when the gain of the amplification circuit 81 is lowered, and this can release the fixation of the output signal CO fixed to "+1" or "−1." In addition, the potential level of the output signal DO rises when the gain of the amplification circuit 81 is raised, and this can release the fixation of the output signal CO fixed to "0."

Figure 16A:
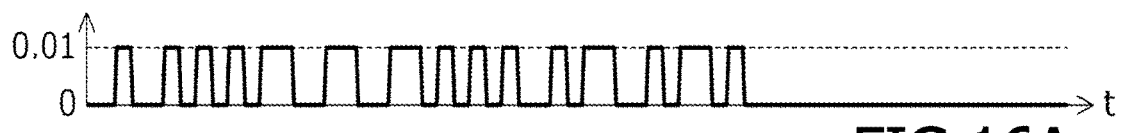
FIG. 16A is a diagram illustrating an example of a pulse signal transmitted by the sensor controller 31.
Figure 16B:
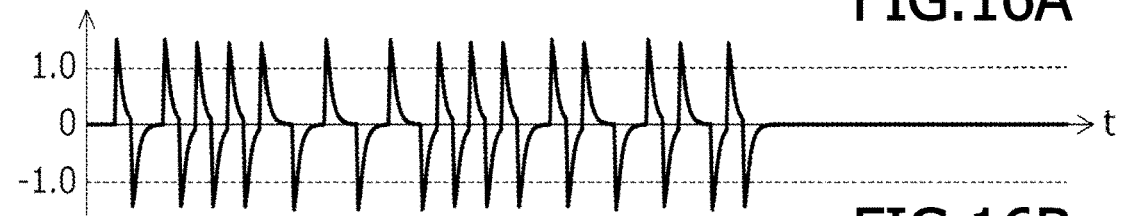
FIG. 16B is a diagram illustrating an output signal DO of an amplification circuit 81 output in the pen 2 receiving the pulse signal illustrated in FIG. 16A.
Figure 16C:
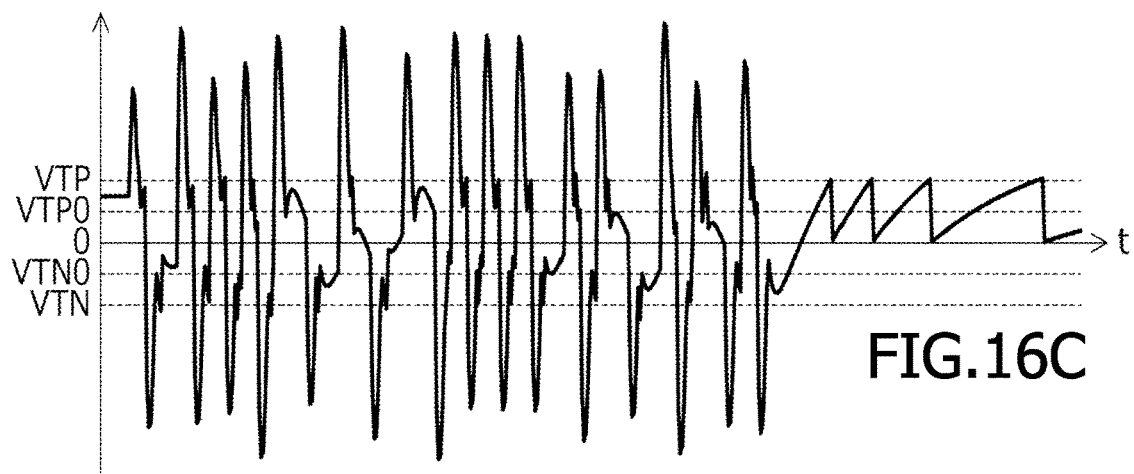
FIG. 16C is a diagram illustrating the output signal IO of an addition circuit 82b corresponding to the output signal DO illustrated in FIG. 16B.
Figure 16D:
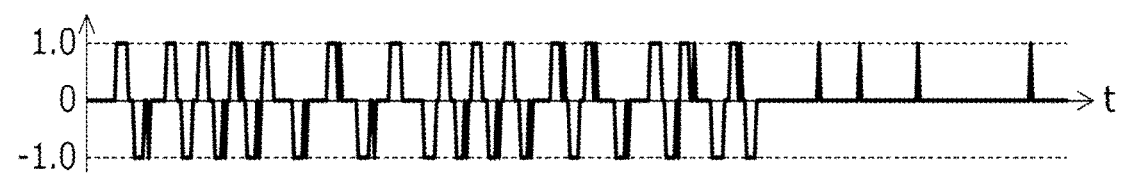
FIG. 16D is a diagram illustrating the output signal CO of an analog circuit 71 corresponding to the output signal IO illustrated in FIG. 16C.
Figure 16E:
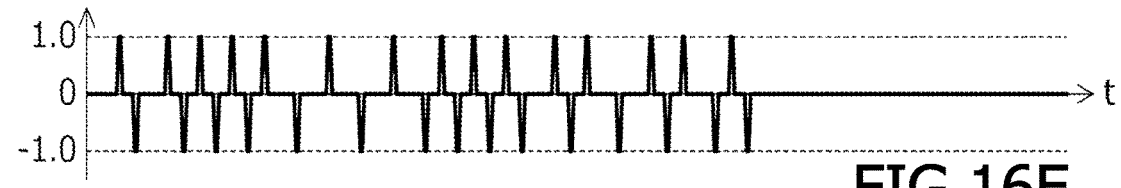
FIG. 16E is a diagram illustrating a known pattern stored in the pattern storage unit 73 according to the pulse signal illustrated in FIG. 16A.
Figure 16F:
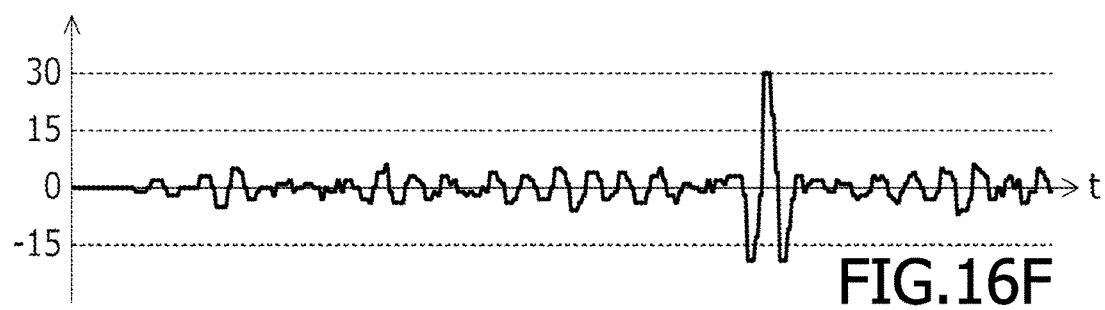
FIG. 16F is a diagram illustrating an output signal FO of an edge matched filter 87 corresponding to the output signal CO illustrated in FIG. 16D and the pattern illustrated in FIG. 16E.

FIG. 16A is a diagram illustrating an example of a pulse signal transmitted by the sensor controller 31. FIG. 16B is a diagram illustrating the output signal DO of the amplification circuit 81 output in the pen 2 receiving the pulse signal. FIG. 16C is a diagram illustrating the output signal IO of the addition circuit 82*b* corresponding to the output signal DO. FIG. 16D is a diagram illustrating the output signal CO of the analog circuit 71 corresponding to the output signal IO. FIG. 16E is a diagram illustrating a known pattern stored in the pattern storage unit 73 according to the pulse signal illustrated in FIG. 16A. FIG. 16F is a diagram illustrating the output signal FO of the edge matched filter 87 corresponding to the output signal CO illustrated in FIG. 16D and the pattern illustrated in FIG. 16E. Hereinafter, the effects of the present embodiment will be described in detail with reference to these drawings along with FIG. 13. Here, FIG. 16C and FIG. 16D illustrate a case of using the comparison circuit 82*c* illustrated in FIG. 14B.

The output signal DO of the amplification circuit 81 is a signal temporarily increasing toward the plus side according to the rising edges of the pulse signal transmitted by the sensor controller 31 and temporarily increasing toward the minus side according to the falling edges as illustrated in FIG. 16B. This is because the high-pass filter 80 illustrated in FIG. 13 functions as a differential circuit.

The output signal IO of the addition circuit 82*b* is a signal folded when the signal exceeds the reference potentials VTP and VTP0 and when the signal falls below the reference potentials VTN0 and VTN as illustrated in FIG. 16C.

Because of the folding, it can be stated that the output signal IO is a signal to which folding modulation (signal folding modulation) is applied. In this way, the ΔΣ modulation unit 82 performs the folding modulation, and the dependency on past signals is reduced. Therefore, according to the reception circuit 61 of the present embodiment, the edges can be more surely detected than in, for example, the reception circuit 61 described in the first embodiment. In addition, the edges can be more surely detected than in a ΔΣ modulation unit of the type that feeds back the comparison results of the comparison circuit 82c in two values (+1, 0) to the subtraction circuit 82a (that is, ΔΣ modulation unit that performs ΔΣ modulation of 1 bit). This is because 0 or +1 is always fed back in the ΔΣ modulation of 1 bit, and only signals with positive values can be handled. However, when the comparison results of the comparison circuit 82c are fed back in odd values, such as three values and five values, to the subtraction circuit 82a, no-signals in the state of 0 (midway between VTP0 and VTN0) can also be handled in addition to the positive and negative signals.

Note that as mentioned here, the feedback to the subtraction circuit 82a can be performed in any odd values, and the values are not limited to the three values illustrated in FIG. 14A or the five values illustrated in FIG. 14B. Note that when, for example, the feedback is handled in 2m+1 values, the comparison circuit 82c can include m comparators corresponding to positive values and m comparators corresponding to negative values.

In addition, when the comparison results of the comparison circuit 82c are fed back in five values (+2, +1, 0, −1, and −2) to the subtraction circuit 82a as in the example illustrated in FIG. 16C, the dependency on past signals is smaller than in the case of the feedback in three values, and the edges can be more surely detected. In addition, the folding modulation allows to use a continuous-time integrator to execute signal processing, and there is also an advantageous effect that the loss of signal can be smaller than in the process using the multi-valued AD as disclosed in, for example, Non Patent Document 1.

The output signal CO of the analog circuit 71 is a pulse signal of three values including a plurality of pulses with respect to one chip of the chip sequence transmitted by the sensor controller 31 as described above. As illustrated in FIG. 16D, the output signal CO is a signal including a pulse of +1 when the output signal IO is higher than the reference potential VTP and including a pulse of −1 when the reference signal IO is lower than the reference potential VTN at the timing of the generation of each pulse.

As can be understood by comparing FIGS. 16A and 16D, the output signal CO includes a large number of pulses other than the pulses corresponding to the edges of the pulse signal transmitted by the sensor controller 31. Therefore, if the known pattern used in the first embodiment (chip sequence obtained by applying Manchester coding to the spread code) is also used in the present embodiment, proper correlation operation results may not be obtained. However, the known pattern used in the present embodiment includes a chip sequence of three values including one chip with respect to one chip of the output signal CO, in which only one chip becomes "−1" according to the change from "+1" to "0" in the transmission chip sequence, only one chip becomes "+1" according to the change from "0" to "+1" in the transmission chip sequence, and the other chips are "0" as illustrated in FIG. 16E. Therefore, even if pulses other than the pulses corresponding to the edges of the pulse signal are included in the output signal CO, this is not reflected on the results of the correlation operation. Therefore, proper correlation operation results can be obtained as illustrated in FIG. 16F based on the output signal CO obtained as a result of the ΔΣ modulation.

As described above, according to the pen 2 of the present embodiment, the edges can be surely detected by the folding modulation executed by the ΔΣ modulation unit even if there is dullness in the waveform of the uplink signal US, and this increases the possibility that the pen 2 can detect the edges. Therefore, the pen 2 can properly receive the uplink signal US.

In addition, the digital circuit 72 performs the correlation operation using three values of +1, 0, and −1, and therefore, proper correlation operation results can be obtained based on the output signal CO obtained as a result of the ΔΣ modulation.

Although the preferred embodiments of the present invention have been described, the present invention is not limited to the embodiments in any way, and it is obvious that the present invention can be carried out in various modes without departing from the scope of the present invention.

For example, the first and second embodiments may be used in combination. That is, the sensor controller 31 that transmits the uplink signal US so as to enhance the edges and the pen 2 that uses the correlation operation based on ΔΣ modulation and three values to receive the uplink signal US can be used in combination. In this way, the pen can more properly receive the uplink signal US.

DESCRIPTION OF REFERENCE SYMBOLS

1: Position detection system
2: Pen
3: Tablet
3a: Touch surface
20: Core
21: Pen tip electrode
23: Pen pressure detection sensor
24: Circuit board
25: Battery
30: Sensor electrode group
30X, 30Y: Sensor electrode
31: Sensor controller
32: Host processor
33: Charger
41: Logic unit
42: Transmission unit
43: Reception unit
44: Selection unit
50: Code sequence holding unit
51: Spread processing unit
51A: Signal source of pulse signal generated by spread processing unit 51
52: Transmission processing unit
52A: Signal source of delay signal generated by transmission processing unit 52
54x, 54y: Switch
55x, 55y: Conductor selection circuit
60: Switch
61: Reception circuit
62: Controller
63: Transmission circuit
71: Analog circuit
72: Digital circuit
73: Pattern storage unit
74: Pulse density detection unit
80: High-pass filter
81: Amplification circuit 82: ΔΣ modulation unit
82a: Subtraction circuit
82b: Addition circuit
82c: Comparison circuit
82d, 82e: Delay circuit
87: Edge matched filter
88: Uplink signal restoration unit
100: Output circuit
101: Potential generation circuit
ACa to ACd: AND circuit
C: Capacitance
C1, Ca to Cd: Capacitive element
CK1, CK2: Clock
cmd: Command
CO: Output signal of analog circuit 71
CPa to CPd: Comparator
DO: Output signal of amplification circuit 81
E1, E2: Edge
E3: Return edge
FO: Output signal of edge matched filter 87
IO: Output signal of addition circuit 82b
OPa to OPd: Op amp
P: Preamble
R: Region
R1 to R8, Ra to Rk, Rm, Rn: Resistance element
Res: Response data
Rx: Reception signal
Sa to Si: Switch
sTRx, sTRy, selX, selY: Control signal
T: Chip length of spread code
UN: Low frequency noise
US: Uplink signal
VDD: Higher power potential
VSS: Lower power potential
Vref, VTP, VTP0, VTN0, VTN:

The invention claimed is:

1. A system, comprising:
a sensor controller configured to
generate a pulse signal representing transmission data, and
transmit the pulse signal, by using a main signal and a sub signal of the pulse signal so as to enhance edges, thereby transmitting the transmission data via a sensor electrode group; and
a pen including
a pen tip electrode arranged near a pen tip,
an analog circuit that detects edges of a signal led to the pen tip electrode,
a pattern storage that stores a plurality of chip sequences as known patterns, and
a digital circuit that performs a correlation operation of an output signal of the analog circuit and the known patterns to recognize the transmission data.

2. The system according to claim 1, wherein
the sub signal is a delay signal of the pulse signal, and
the sensor controller transmits a mixed signal of the main signal and the sub signal to transmit the pulse signal.

3. The system according to claim 2, wherein
the sensor controller uses a spread code, in which a time length of one chip is a predetermined chip length, to spread the transmission data to thereby acquire the pulse signal, and
the mixed signal is a signal including an even number of corresponding edges in a time shorter than a half the predetermined chip length starting at each edge of the pulse signal.

4. The system according to claim 3, wherein
the mixed signal includes return edges in an opposite direction of the corresponding edges in a time shorter than the half the predetermined chip length starting at each edge of the pulse signal, and
a slope of the return edge is gentler than a slope of each edge of the pulse signal.

5. The system according to claim 1, wherein
the sensor electrode group includes a plurality of sensor electrodes, and
the sensor controller transmits the main signal and the sub signal from the sensor electrodes different from each other to transmit the pulse signal.

6. The system according to claim 1, wherein
the sensor electrode group includes a plurality of first sensor electrodes arranged in a first layer and a plurality of second sensor electrodes arranged in a second layer, and
the sensor controller transmits the main signal from at least part of the plurality of first sensor electrodes and transmits the sub signal from at least part of the plurality of second sensor electrodes to thereby transmit the pulse signal.

7. The system according to claim 6, wherein each of the plurality of first sensor electrodes is an electrode supplied with potential necessary for driving a pixel of a display apparatus.

8. The system according to claim 1, wherein
the sensor electrode group includes a plurality of first sensor electrodes and a plurality of second sensor electrodes arranged at positions not overlapping the plurality of first sensor electrodes in plan view, and
the sensor controller is configured to transmit the main signal through the plurality of first sensor electrodes and transmit a reverse-phase signal of the main signal through the plurality of second sensor electrodes.

9. The system according to claim 1, wherein the pen is a first pen that applies a correlation operation with relatively coarse granularity to the output signal of the analog circuit or a second pen that applies a correlation operation with relatively fine granularity to the output signal of the analog circuit.

10. The system according to claim 1, wherein the chip sequences as the known patterns are obtained by applying Manchester coding to spread codes used to transmit the transmission data.

11. The system according to claim 10, wherein the digital circuit includes a shift register configured to store the output signal of the analog circuit, and the digital circuit calculates a correlation between a chip sequence stored in the shift register and the known patterns stored in the pattern storage, respectively.

12. The system according to claim 11, wherein the digital circuit, when a calculated correlation result for one of the known patterns is equal to or greater than a predetermined value, determines that the spread code corresponding to the known pattern is recognized.

* * * * *